(12) United States Patent
Holden et al.

(10) Patent No.: US 8,831,913 B2
(45) Date of Patent: Sep. 9, 2014

(54) METHOD OF DESIGN OPTIMISATION

(75) Inventors: Carren Holden, Bristol (GB); Adam Nurdin, Bristol (GB); Neil W. Bressloff, Bristol (GB); Andrew K. Keane, Bristol (GB)

(73) Assignee: Airbus Operations Limited, Bristol (GB)

( * ) Notice: Subject to any disclaimer, the term of this patent is extended or adjusted under 35 U.S.C. 154(b) by 924 days.

(21) Appl. No.: 12/482,003

(22) Filed: Jun. 10, 2009

(65) Prior Publication Data

US 2010/0318327 A1  Dec. 16, 2010

(51) Int. Cl.
*G06F 17/50* (2006.01)
*G06G 7/48* (2006.01)
*G06G 7/50* (2006.01)
*G06T 15/00* (2011.01)
*G09G 5/00* (2006.01)

(52) U.S. Cl.
USPC ......... 703/1; 703/8; 703/9; 345/419; 345/619

(58) Field of Classification Search
CPC ........... G06F 17/50; G06F 7/60; G06T 17/20; G06T 15/00; G06T 17/00; G06G 7/48; G06G 7/50; G09G 5/00
USPC .................... 703/2, 8, 9, 1; 345/419, 420, 619
See application file for complete search history.

(56) References Cited

U.S. PATENT DOCUMENTS

2008/0275677 A1* 11/2008 Landon ............................. 703/2

OTHER PUBLICATIONS

Brezillon et al., Aerodynamic Optimization for Cruise and High-Lift Configurations, May 23-24, 2007, Megadesign and MegaOpt—German Initiatives for Aerodynamic Simulation and Optimization in Aircraft Design, Springer Berlin/Heidelberg, vol. 107, pp. 249-262.*
Jamshid A. Samareh, Aerodynamic Shape Optimization Based on Free-form Deformation, Jul. 8, 2004, pp. 1-13.*
Kuhn et al., Engineering Optimisation by Means of Knowledge Sharing and Reuse, 2008, IFIP International Federation for Information Processing, vol. 277, Computer-Aided Innovation (CAI), pp. 95-106.*
Amoiralis et al., Freeform Deformation Versus B-Spline Representation in Inverse Airfoil Design, Jun. 2008, Journal of Computing and Information Science in Engineering, vol. 8, No. 2, pp. 1-13.*
Brezillon et al., Aerodynamic Optimization for Cruise and High-Lift Configurations, May 23-24, 2007, Megadesign and MegaOpt —German Initiatives for Aerodynamic Simulation and Optimization in Aircraft Design, Springer Berlin/Heidelberg, vol. 107, pp. 249-262.*

(Continued)

*Primary Examiner* — Kamini S Shah
*Assistant Examiner* — Juan Ochoa
(74) *Attorney, Agent, or Firm* — Lowe Hauptman & Ham, LLP

(57) ABSTRACT

A method of design optimization, the method comprising producing a first computer model of a first geometry, producing a CFD mesh from the first computer model, using the CFD mesh from the first computer to produce a measure of the fluid dynamic performance of the first geometry, producing a new computer model of a new geometry, producing a CFD mesh from the new computer model, using the CFD mesh to produce a measure of the fluid dynamic performance of the new geometry, and "identifying an optimal geometry using the fluid dynamic performance measurements of the first and new geometries previously produced.

6 Claims, 24 Drawing Sheets

(56) References Cited

OTHER PUBLICATIONS

Ye et al., Reverse innovative design—an integrated product design methodology, Available online Aug. 1, 2007, Computer-Aided Design, vol. 40, Issue 7, Jul. 2008, pp. 812-827.*

Brezillon et al., Development and Application Of A Flexible And Efficient Environment For Aerodynamic Shape Optimisation, 2006, Proceedings of the ONERA-DLR Aerospace Symposium (ODAS), Toulouse, pp. 1-10.*

Dwight and Brezillon, Adjoint Algorithms For The Optimization Of 3d Turbulent Configurations, Jan. 1, 2008, Springer Berlin Heidelberg, New Results in Numerical and Experimental Fluid Mechanics VI, NNFM 96, pp. 194-201.*

Desideri and Janka, Multilevel Shape Parameterization for Aerodynamic Optimization: Application to Drag and Noise Reduction of Transonic/Supersonic Business Jet, Jul. 24-28, 2004, ECCOMAS 2004, pp. 1-14.*

Brezillon et al., Numerical aerodynamic optimisation of 3d high-lift configurations, Sep. 14-19, 2008, 26th International Congress of the Aeronautical Sciences, pp. 1-11.*

Menzel et al., Application of Free form deformation techniques in evolutionary design optimisation, May 30-Jun.3, 2005, 6th World Congress on Structural and Multidisciplinary Optimization, Rio de Janeiro, pp. 1-10.*

Huang et al., MetaMorphs: Deformable Shape and Texture Models, 2004, IEEE CVPR Proceedings, pp. 1-8.*

* cited by examiner

Table 1: DLR-F6 geometry details

| Property | Value |
|---|---|
| $S/2$ | $72700mm^2$ |
| $c$ | $141.2mm$ |
| $b/2$ | $585.647mm$ |
| $AR$ | $9.5$ |
| $X_{ref}$ | $157.9mm$ |
| $Y_{ref}$ | $0mm$ |
| $Z_{ref}$ | $-33.92mm$ |
| $M_{cruise}$ | $0.75$ |
| $C_{L_{cruise}}$ | $0.5$ |
| $Re_{cruise}$ | $3 \times 10^6$ |

Figure 9

Fluent Setup

Solver: Coupled density based with energy equation.

Turbulence model: Spalart-Allmaras 1 transport equation

Flow medium: Air - Ideal gas

Solver Courant number: 5

Discretization scheme: second order

Flow mach number: 0.75

Reynolds number: $3 \times 10^6$

Figure 15

Design point 9

Design point 57

Design point 8

Design point 15

Design point 47

Design point 39

| Mesh | Coarse | Intermediate | Fine |
|---|---|---|---|
| number of Nodes, N | 1.8 mil | 6.0 mil | 11.2 mil |
| Boundary layer initial height | 0.03mm | 0.03mm | 0.01mm |
| Number of Boundary cells | 5 | 5 | 5 |
| Boundary layer growth rate | 1.22 | 1.22 | 1.22 |
| Boundary layer total height | 0.081mm | 0.081mm | 0.027mm |
| Minimum local cell height | 0.031 | 0.031 | 0.015625 |
| Boundary box size | 106c | 106c | 106c |

Figure 19

| Parameter | Experimental Data |
|---|---|
| $AoA, deg$ | 0.52 |
| $C_L$ | 0.500 |
| $C_D$ | 0.0295 |

Figure 21

| Parameter | DPW Ave Coarse | Coarse |
|---|---|---|
| $AoA, deg$ | 0.131 | 0.091 |
| $C_L$ | 0.5001 | 0.4990 |
| $C_D$ | 0.02985 | 0.031 |
| Parameter | DPW Ave Inter | Inter |
| $AoA, deg$ | 0.161 | 0.091 |
| $C_L$ | 0.5000 | 0.4999 |
| $C_D$ | 0.02902 | 0.032 |
| Parameter | DPW Ave Fine | Fine |
| $AoA, deg$ | 0.1529 | 0.092 |
| $C_L$ | 0.4999 | 0.5001 |
| $C_D$ | 0.02883 | 0.0321 |

Figure 22

METHOD OF DESIGN OPTIMISATION

FIELD OF THE INVENTION

The present invention relates to a method of design optimisation.

BACKGROUND OF THE INVENTION

Over recent years the advancement made in computing power has revolutionised the process of designing aerodynamic structures. Traditional trial and error methods have been replaced by automated optimisation routines. The general idea is that by parameterising a design by a series of design variables and then automating design generation and assessment, a search process can be used to find optimum designs. During such an optimisation process hundreds/thousands of designs can be produced that have to be evaluated. It is therefore important to keep the computing resources needed per design to a minimum. However, it is now also commonplace within the aerodynamics industry to employ high fidelity computational fluid dynamics (CFD), a computationally expensive method, as a design quality assessment tool.

A typical optimisation process using CFD analysis is illustrated in FIG. 1. Here, a CFD mesh representation 2 of an aerodynamic structure is generated from a corresponding Computer Aided Design (CAD) model 1. A CFD analysis is performed on the mesh at step 3 and the results are analysed at step 4 to determine whether the design has been optimised. If so, the optimal design is output from the process at step 5. If not, the design is altered at step 6. This will be explained in more detail below. A CFD analysis is then performed on the altered design at step 3 and the results are analysed again at step 4. This process is repeated until an optimal design has been found.

For aerodynamic shape optimisation a flexible parameterisation method is required to generate new aerodynamic designs at step 6. Within the field of shape optimisation the method of shape parameterisation is critical to the overall success of the optimisation process. The parameterisation technique defines the design space and hence determines the range of possible designs the optimisation process can produce. The suitability of a particular parameterisation technique is based on its ability to balance the need for a flexible representation with a manageable number of design variables. If the parameterisation is too inflexible the number and variation of the possible shapes is restricted, thereby restricting the outcome of the optimisation process. Conversely, a very flexible parameterisation is likely to require a large number of design variables. If the number of design variables is too large the design space becomes inefficient and the search process will struggle to find the optimum design.

Samareh, J. A., "A survey of Shape Parameterization Techniques", Tech. rep., NASA Langely Research Center, Hampton, Va., June 1999 (Samareh) presents a survey of possible shape parameterisation techniques, which discusses in detail the advantages and disadvantages of each process. One popular parameterisation technique is to use splines to define the shape. However, for complex geometries this method typically requires a large number of design variables. Free Form Deformation (FFD) is highlighted as a potentially effective shape parameterisation technique. FFD has been successfully implemented as a shape parameterisation method for aerodynamic surfaces within an optimisation process. In particular, FFD is typically used in step 6 of the optimisation strategy described in FIG. 1 in order to alter non-optimal designs. In such a typical optimisation process, FFD is performed directly on the CFD analysis mesh and a CAD geometry is not present within the optimisation loop. If a CAD model of the resulting geometry is required, reverse engineering techniques need to be utilised at step 7 to recreate the CAD model from the deformed CFD mesh. However, it is difficult to recreate the CAD model from the deformed CFD mesh precisely.

Free-Form Deformation (FFD) Techniques and Utilisation

FFD was first introduced in Sederberg, T. W. and Parry, S. R., "Free-Form Deformation of Solid Geometric Models", *SIGGRAPH'86*, Vol. 20, ACM, August 1986, pp. 151-160 (Sederberg and Parry) in the field of computer graphics as a method for deforming geometric models in a flexible manner. In general, free-form deformation techniques encompass the following processes: first a volume definition is required and positioned such that it encloses the geometry; a method is then used to deform said volume and finally the geometry inside the volume must deform as part of the volume that encloses it. Sederberg and Parry's FFD method achieves this by using a tricubic Bezier volume that is defined using a lattice of control points. Movements in these control points provide the deformation of the control volume needed. This deformation occurs in an analogous fashion to deforming a Bezier curve through its polygon points. Deformations applied to the Bezier volume are passed to the geometry through its parametric co-ordinates. The following physical analogy, illustrated by FIGS. 2a and 2b, was proposed by Sederberg and Parry and is useful to understand the general FFD method. The geometry to be deformed is in this example a flexible rubber ball 10. This geometry is embedded within a clear flexible plastic block 12. As the block 12 is deformed to produce a deformed block 12a (see FIG. 2b) the embedded geometry 10 is forced to deform in a similar fashion to produce a deformed geometry 10a. The deformed block/geometry 12a, 10a is shown in FIG. 2b. FFD is the mathematical equivalent of this process.

The Sederberg and Parry FFD method can be described in three steps: Control volume/lattice construction; freezing the lattice; lattice and geometry deformation. The three general steps are now discussed in turn.

1. Control Volume/Lattice Construction

As previously mentioned Sederberg and Parry define the control volume which is defined by a regular uniformly subdivided 3D lattice of control points. The lattice consists of l, m and n control points in the S, T and U directions respectively. Within the control volume a local co-ordinate system is defined such that any point X within the control volume is defined by $$X = X_0 + sS + tT + uU; \qquad (1)$$

where $X_0$ is the origin of the local co-ordinate system in Cartesian co-ordinates. Note that for any point within the control volume $0 < s < 1$, $0 < t < 1$ and $0 < u < 1$. Although Bezier volumes were used in the discussion by Sederberg and Parry, it is also possible to use other basis functions such as B-splines or non-uniform rational B-splines (NURBS).

Sederberg and Parry restrict the initial lattice shape to be parallelepiped and aligned with the global co-ordinate system. While this limits the types of deformations achievable it has two major advantages. First, because of the convex hull property of Bezier volumes, the parallelepiped condition is necessary to ensure the control volume completely fills the defining lattice. The implication of this is that any geometry enclosed by the lattice can be defined using the Bezier volume parametric co-ordinates. If the initial lattice shape is not parallelepiped the user would need a good knowledge of Bezier curves and their behaviour to form the control volume. The second advantage, which is as a consequence of the first is that the "lattice freezing" process is drastically simplified.

2. Freezing the Lattice

'Freezing the lattice' requires the calculation of the position of each geometry point in the local co-ordinate system. For a parallelepiped control volume this can be accomplished through simple linear algebra.

3. Lattice and Geometry Deformation

Deformations are applied to the lattice by moving the control points away from their original positions. The geometry deformed position is then defined by a trivariate tensor product Bernstein polynomial, as $$X_{ffd} = \sum_{i=0}^{l}\sum_{j=0}^{m}\sum_{k=0}^{n} Bi(s)Bj(t)Bk(u)Pi, j, k \quad (2)$$

In the case of the control volume definition using a Bezier volume the general form of the Bernstein polynomials is:

$$B_i(s) = \binom{l}{i}(1-s)^{l-1}s^l \quad (3)$$

FFD Advances

Although the FFD method presented by Sederberg and Parry is a powerful deformation tool it does have limitations. The two most significant of these are the restrictions on the lattice shape, and the indirect nature of the control mechanism. Sederberg and Parry restrict the initial lattice shape to be regular, parallelepiped and aligned with the global co-ordinate system. These restrictions limit the types of deformations achievable. The indirect nature of the FFD control mechanism means it is not entirely obvious to the user what deformation can be achieved by moving control points. With respect to shape optimisation this increases the complexity of choosing the design variables needed to achieve the required deformation types. This is further complicated if the control lattice contains internal control points. These limitations have been addressed by numerous studies some of which are discussed below.

1. Basis Functions

The flexibility of the initial control volume representation was increased first in Griessmair, J. and Purgathofer, W., "Deformations of solids with trivariate B-spline", *Eurographics*, 1998 (Griessmair and Purgathofer) and then Lamousin, H. J. and Jr, W. N. W., "NURBS-based Free-Form Deformations," *IEEE Computer Graphics and Applications*, November 1994, pp. 59-65 (Lamousin and Waggenspack), who extended the FFD method to use B-spline and NURBS bases, respectively. Lamousin and Waggenspack illustrate their method by deforming a model of a human leg. Lamousin and Waggenspack show that the use of NURBS as the basis function enables the use of a non-uniformly spaced lattice and deformation through control point weights. These abilities increase the flexibility of the original FFD method. However, the control lattice is still restricted to a parallelepiped shape.

When using a NURBS basis with the FFD methods the lattice freezing process is complicated as a numerical search technique is needed. This can be avoided if the NURBS weights are all uniform and set to one. Lamousin and Waggenspack use a golden section search routine, whereas a Newton approximation is utilised in Coquillart, S., "Extended Free-Form Deformation: A Sculpturing Tool for 3D Geometric Modeling", *SIGGRAPH '90*, Vol. 24, ACM, August 1990, pp. 187-196 (Coquillart). Whichever search process is used can be very computationally expensive. However, if the grid is orthogonal and aligned with the global Cartesian co-ordinates the problem can be separated into three smaller independent searches, one for each of the local co-ordinate directions.

It is important to note that typically during an optimisation process the lattice creation and freezing processes only occur once. New designs are generally created by deforming a 'base' design and lattice. Therefore the computational expense required to freeze the lattice is only encountered once.

2. Extended Free Form Deformation (EFFD)

EFFD was first introduced by Coquillart (see above) and expands the FFD methods to use non-parallelepiped shaped lattices. Coquillart uses a tensor product piecewise tricubic Bezier volume to define the geometry deformation. Within each subdivision of a standard l×m×n FFD lattice, termed a "chunk" in Clark, J. H., "Parametric curves, surfaces and volumes in computer graphics and computer-aided geometric design", Tech. rep., Stanford, Calif., USA, 19 (Clark), Coquillart places an arbitrary tricubic Bezier volume. This extends the original lattice to a (3l+1)×(3m+1)×(3n+1) lattice. Each chunk is equivalent to a single basic FFD volume as presented by Sederberg and Parry. Within Coquillart's EFFD implementation only the corner points of the chunks can be deformed. The positions of the intermediate lattice points are automatically calculated from the chunk point positions and are positioned so as to maintain continuity between the chunk volumes. This is done by maintaining a constant tangent over the chunk boundaries. Freezing the lattice requires first locating the lattice chunk that the geometry resides within and then using numerical search techniques to find the local point co-ordinates. Each geometry point within a chunk is defined by:

$$X_{ffd} = \sum_{i,j,k=0}^{3} Bi(s)Bj(t)Bk(u)Pi, j, k \quad (4)$$

where in this case Bi,Bj,Bk are the control points of fourth order Bernstein polynomials. If the chunk is not parallelepiped a numerical search technique is utilised to solve (4) and find the points.

Coquillart states that the shape of the FFD lattice has a large effect on the deformations achievable. However, the use of lattices which are too complex can produce unpredictable results. The implication of this with respect to shape optimisation is that the choice of the lattice shape is critical to the shape of the design space and consequently the result and efficiency of the optimisation process. A knowledge of the required type of deformation and/or approximate optimum shape will aid lattice selection.

While the EFFD method does enable a greater range of deformations when compared to the original FFD methods, it loses some of the flexibility due to the automatic calculation of intermediate lattice points. It is also clear that the numerical search techniques needed to freeze the EFFD lattice are time consuming and computationally expensive. The EFFD lattice by its very nature will rarely be aligned with the global Cartesian co-ordinate system. Due to this the numerical search cannot be reduced to three line searches, which can be used when a NURBS basis is utilised. Instead a more complicated three variable volume search is required. However, during a design optimisation process freezing the lattice still only needs to occur once to freeze the base design. All subsequent designs will use the frozen base co-ordinates.

3. Directly Manipulated Free Form Deformation (DMFFD)

DMFFD was first introduced in Hsu, W. M., Hughes, J. F., and Kaufman, H., "Direct Manipulation of Free-Form Deformations", *Computer Graphics*, Vol. 26, No. 2, July 1992, pp. 177-184 (Hsu et al) as a method of providing a more intuitive interface for the FFD routines. In order to do this a new type of point is defined. An object point is a point placed within the global co-ordinate system on to a particular part of the geometry that can be used as a manipulation handle. The user defines the required position of the object point after deformation. The deformed control point locations needed to produce the required deformation are then calculated and are subsequently used with Eq(3) above to determine the deformed geometry positions. In order to calculate the required control point locations the following systems of equations have to be solved:

$$\Delta Ob = B^* \Delta P \quad (5)$$

Within the literature there are two distinct methods for solving this equation for the control point displacements. Hsu et al utilised a pseudoinverse of B* enabling the above equation to be rearranged to produce:

$$\Delta P = B^+ \Delta Ob \quad (6)$$

If the number of object points is less than or equal to the number of lattice control points this equation is solvable. However, if the number of object points is greater than the number of lattice control points the system of equations is over-determined and hence there is no unique solution. If the system of equations is under-determined, i.e. the number of control lattice points does not equal the number of object points, multiple solutions exist. In this situation the pseudoinverse gives the least squares solution and so defines the solutions with the minimum control point displacement. In Hu, S.-M., Zhang, H., Tai, C.-L., and Sun, J.-G., "Direct Manipulation of FFD: Efficient Explicit Solutions and Decomposible Multiple Point Constraints", *Visual Computer*, Vol. 17, July 2001, pp. 370-379 (Hu et al), a method that uses constrained optimisation is outlined to derive an explicit solution without the use of a pseudoinverse. The resulting solution is:

$$\Delta Pi, j, k = \frac{Bi, j, k(s_l, t_l, u_l)}{\sum_{i,j,k=0}^{1,m,n} B_{i,j,k}^2 (s1, t1, u1)} (Ob_t - Ob_1) \quad (7)$$

This equation calculates the control point displacements needed to achieve one objective point deformation. Hu et al showed that for multiple objective points the required deformation can be achieved by a series of sequential single objective point calculations, as long as the objective points are mutually independent, i.e., only one object point is present in an individual lattice "chunk".

With respect to shape optimisation, when DMFFD is used the design variables are the objective point deformed co-ordinates. This method can be used to reduce the number of design variables while maintaining the flexibility within the geometry representation.

SUMMARY OF THE INVENTION

A first aspect of the present invention provides a method of design optimisation, the method comprising:

a. producing a first computer model of a first geometry, the first computer model comprising:
  i. a set of nodes; and
  ii. a set of construction points each having a position defined by a local co-ordinate system;
b. producing a computational fluid dynamics (CFD) mesh from the first computer model;
c. using the CFD mesh to produce a measure of the fluid dynamic performance of the first geometry, such as drag count or lift coefficient;
d. producing a new computer model of a new geometry by:
  i. moving one or more of the nodes; and
  ii. recalculating the positions of the construction points in response to movement of the one or more nodes;
e. producing a computational fluid dynamics (CFD) mesh from the new computer model;
f. using the CFD mesh to produce a measure of the fluid dynamic performance of the new geometry, such as drag count or lift coefficient; and
g. identifying an optimal geometry using the fluid dynamic performance measurements of the first and new geometries produced in steps c and f.

The nodes may be Bezier poles as described in, for example, Holden, C. M. E. and Wright, W. A. "*Optimisation Methods for Wing Section Design.*" Proceedings of the 38th Aerospace Sciences Meeting and Exhibit, Reno, Nev., January 2000, *AIAA* 2000-0842; non-uniform rational B-spline (NURBS) poles; or freeform deformation (FFD) nodes defining an FFD volume. In the case where the nodes are FFD nodes, then the set of construction points each have a position defined by a local co-ordinate system within the FFD volume; and the computer model of a new geometry is produced by: deforming the FFD volume by moving one or more of the FFD nodes; and recalculating the positions of the construction points in response to the deformation of the FFD volume.

Preferably the nodes defined in step a)i) are a 3D lattice of nodes, particularly when complex geometries are involved. It is also preferable that the set of nodes defined in step a)i) comprises an active set of nodes which can be moved in step d)i) and a fixed set of nodes which cannot be moved in step d)i). This enables continuity to be maintained between the geometry to be optimised and any adjoining geometries.

Steps d)-f) may be performed plural times sequentially before performing step g) in order to identify an optimal geometry in step g). In this case, each new geometry may be an iterated version of the previous geometry. An optimal one of these geometries may then be selected in step g) based on its fluid dynamic performance as measured in step c) or f). Alternatively, steps d)-f) may be performed plural times simultaneously before performing step g). In this case, before performing step g), the method may further comprise interpolating between the results of steps c) and f) for the first and new geometries to construct a response surface which approximates a measure of the fluid dynamic performance for a plurality of further geometries. In step g), an optimal geometry may then be identified from the response surface. In this case, the optimal geometry identified in step g) may not be one of the geometries produced in steps a) or d). Preferably, in this case, the method further comprises: testing the quality of the response surface; and, if the response surface is of insufficient quality, repeating steps d)-f) for one or more further geometries and using the results of step f) for the one or more further geometries to improve the quality of the response surface before performing step g). This ensures that a geometry is not wrongly identified as optimal from an inaccurate response surface.

BRIEF DESCRIPTION OF THE DRAWINGS

Embodiments of the invention will now be described with reference to the accompanying drawings, in which:

FIG. 9 is a table displaying the properties of the DLR-F6 geometry;

FIG. 15 is a table displaying an initial set up for a CFD analysis;

FIG. 19 is a table displaying details of the mesh sizes and associated boundary layers for the DLR-F6 geometry;

FIG. 21 is a table showing the cruise condition details for the first case study from the second drag prediction workshop (see below);

FIG. 22 summarises the lift and drag data found during the second drag prediction workshop and analysis of the coarse and intermediate meshes.

DETAILED DESCRIPTION OF EMBODIMENT(S)

A method of design optimisation according to the invention is described below with reference to a case study. In this particular study, the aerodynamic optimisation of a faring placed around the wing/fuselage junction (termed the 'wing fillet') of a typical transonic passenger aircraft is considered. However, before this is discussed in detail, some of the methodologies used in this study are described.

DM-EFFD

The method described in the case study uses an implementation of a three-dimensional Directly Manipulated Extended FFD Method (DM-EFFD) using a B-spline basis. This method is chosen as the EFFD grid allows a greater flexibility of shape parameterisation. It is clear from the typical FFD usage detailed in the literature (see 'Background Of The Invention' above) that the selection of the FFD lattice is critical to the outcome of the optimisation process. During the case study discussed below the EFFD grid enables the lattice to be wrapped around the wing profile, producing surface deformation normal to the wing. A direct manipulation scheme is chosen to reduce the number of design variables and to make the design space more manageable. The B-spline basis is used as it provides the necessary local control without the added complexity of using a NURBS basis.

Figure 1:
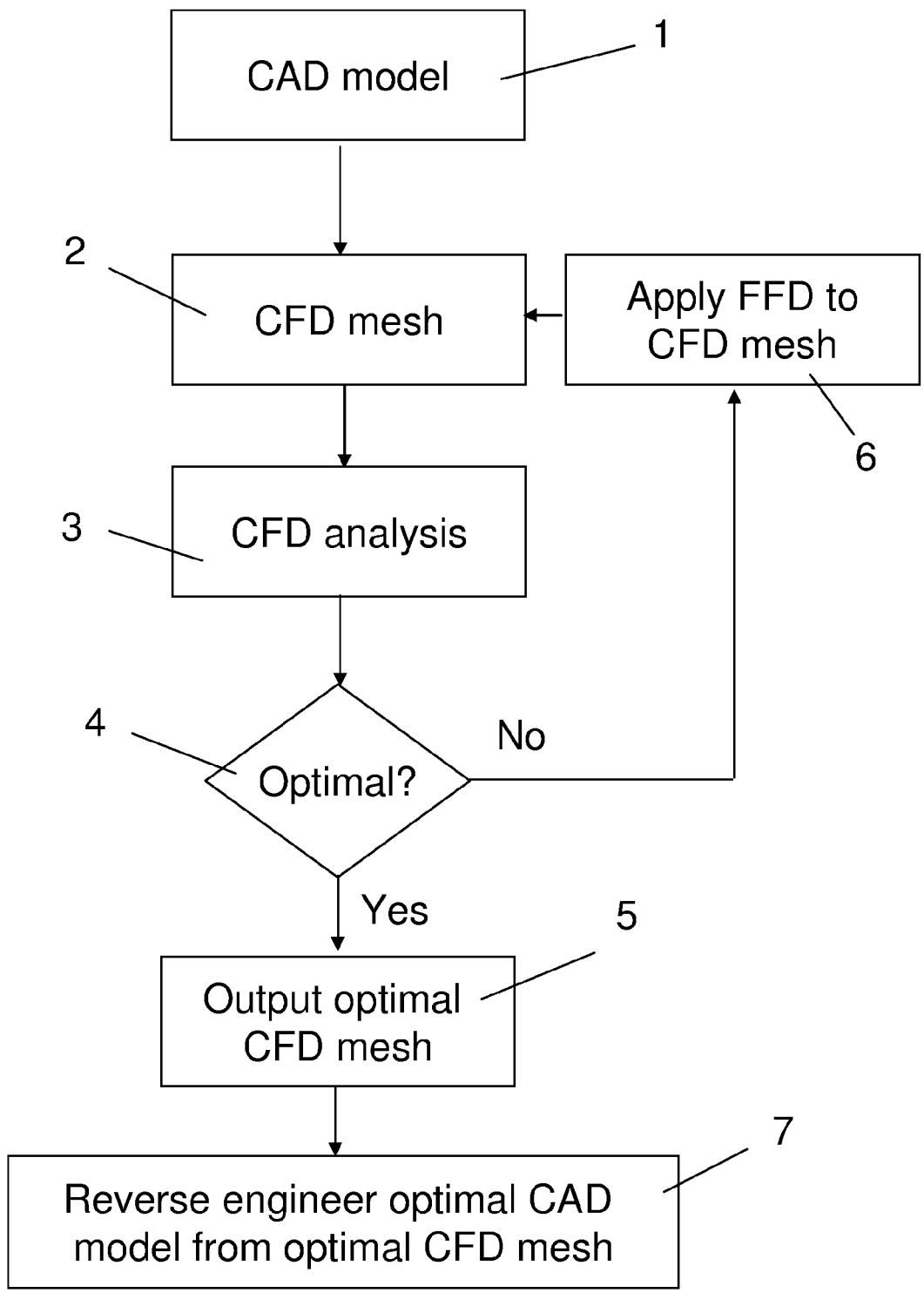
FIG. 1 is a block diagram illustrating a conventional method of design optimisation.
Figure 2:
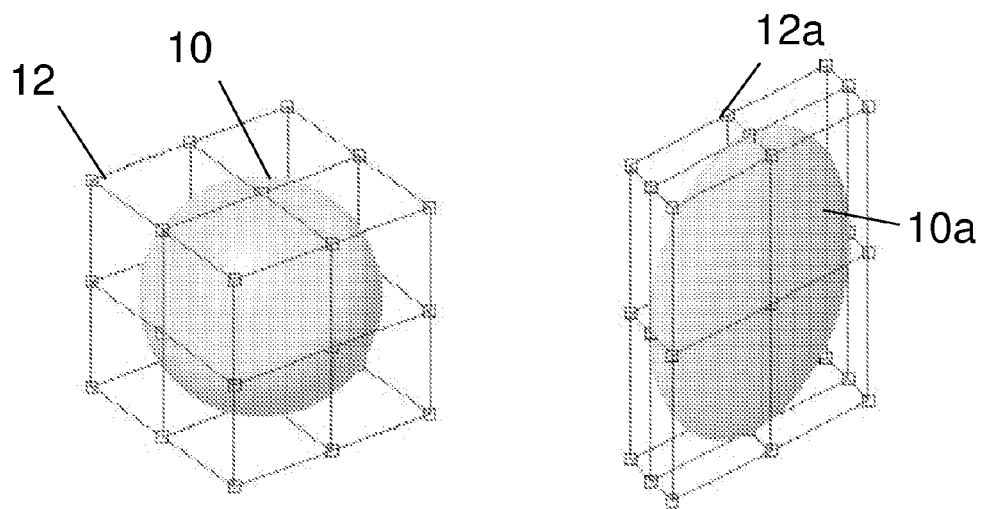
FIG. 2 shows a sphere being deformed by Free Form deformation (FFD)
Figure 3:
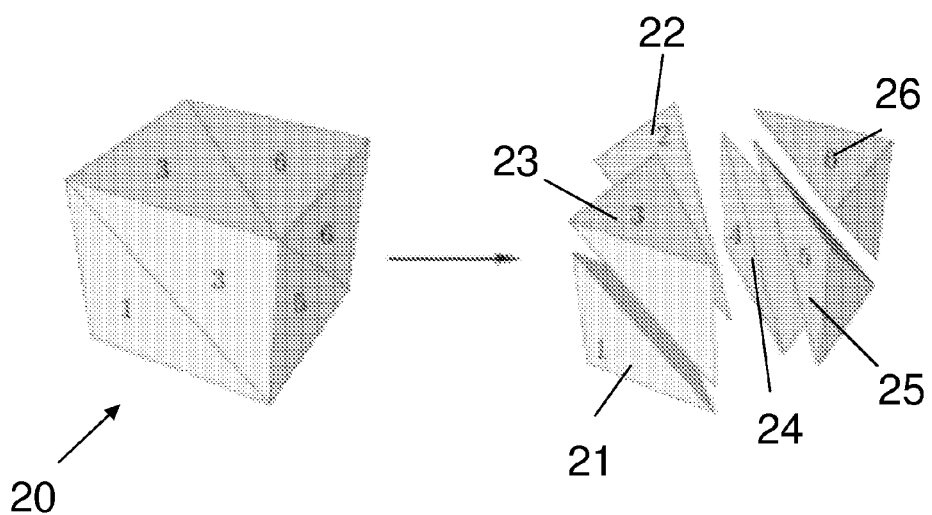
FIG. 3 illustrates a Delaunay tessellation which subdivides EFFD lattice chunks into six simplex elements.

The EFFD implementation employed in this study uses a piecewise tricubic B-spline volume to define the deformable space. In order to determine the chunk within which a geometry point resides, a 3-dimensional Delaunay tessellation is used. This is illustrated in FIG. 3. In the example shown, the Delaunay tessellation subdivides each chunk 20 into six simplex elements 21-26. This is implemented using the MATLAB function delaunay. The convex-hull properties of each of the simplex elements can then be used to determine if a geometry point lies within any of the simplex elements and subsequently within that lattice chunk.

Sequential Quadratic Programming (SQP) is used to solve the constrained optimisation problem of calculating the local co-ordinates of each geometry point. An initial estimate of the local co-ordinate of [0.5, 0.5, 0.5] is used to start the optimisation. This is the same seed point as used by both Lamousin and Waggenspack and Coquillart, neither of whom found any cases that did not converge.

The EFFD lattice is directly manipulated using a slight alteration to the explicit direct manipulation solution Hu et al developed. When freezing the initial lattice, the local co-ordinates of the direct manipulation points are calculated in the same manner as the geometry points, i.e. first the chunk they reside within is found and then a numerical search of the volume is used. During this process each direct manipulation point is tagged with a flag to the chunk it resides in. This speeds up the FFD routine as the chunk search process is only executed once. Once the chunks that the direct manipulation points reside in are known, the Hu et al explicit direct manipulation solution is used to determine the chunk inner lattice node deformations required. The chunk corner nodes of the EFFD lattice are then calculated from the chunk inner lattice corner node positions.

In the following sections, details are given of how the DM-EFFD method is integrated with a CAD geometry into the optimisation framework.

CAD Integration

A CAD geometry is maintained within an optimisation framework by integrating the FFD techniques set out above with the chosen CAD package. The CAD software used throughout this study is CATIA V5 (version 5 of CATIA), although the methodologies presented should be applicable with any of the major CAD packages. Attempts to use CAD directly in optimisation are not new of course. For example in Fudge, D. M., Zingg, D. W., and Haimes, R., "A CAD-Free and a CAD-Based Geometry Control System for Aerodynamic Shape Optimization," *AIAA*, Vol. 51, No. 4, January 2005, pp. 1-15 (Fudge et al) both a CAD based and a CAD free optimisation system are produced. Fudge et al communicated with CATIA V5 through the use of CAPRI (Computational Analysis Programming Interface). However, the methodology outlined here does not use this middle-ware but communicates with the CAD software through internal CAD functions/methods.

To integrate the FFD techniques with a CAD package it is necessary to be able to manipulate the baseline surface construction points. However, within the CATIA package while the surface construction points are available within the Surface Sculptor workbench, this approach cannot be automated and hence negates its usefulness for integration with an optimisation process. It is therefore necessary to identify alternative methods of CAD integration.

Two possible methods of CAD integration are considered. Firstly, the surface can be exported from CATIA using the Initial Graphics Exchange Specification (IGES) standard, through which access can be gained to the surface construction points. Alternatively, if the surface is created by lofting through spline profiles, CATIA design tables can be used to gain access to the spline construction points. These methods are described in more detail below.

A. CATIA Design Tables

CATIA design tables allow the values of CATIA geometry constraints to be linked with an external file. This can take the form of an Excel sheet or a tab delimited text file. The design table can be edited externally and the design can then be updated with the new values. Any CATIA constraints applied within a CATIA model can be linked with a design table, although typically design tables are used with numerical constraints.

Although CATIA design tables cannot be used to export surface construction points from CATIA, they can still be used to integrate FFD methods. If the surface to be deformed/optimised is created using the 'loft' command, parameterising the loft profiles in turn parameterises the desired surface. It is commonplace for lofting profiles to consist of splines constructed through points. If the position of the spline construction points are constrained, a design table can be used to export the constrained co-ordinates. This re-parameterisation is particularly useful if there is a large number of lofting profiles as the number of construction point co-ordinates will be too large to use directly as design variables.

The method of constructing the loft profiles is particularly important when using this method. The loft profiles can be constructed either within the CATIA global environment using three-dimensional points, or within a CATIA sketch using two-dimensional points. A CATIA sketch is a planar two dimensional environment with an independent origin. There are two reasons why this is significant when linking the FFD methods. First, any point co-ordinates use the sketch origin as the reference point. It is therefore important that the sketch origin is the projection of the global origin onto the sketch plane. The second reason why profile construction using a CATIA sketch is significant is that any profile constructed using a CATIA sketch can only be deformed within the sketch plane. This has to be taken into account when setting up any subsequent FFD operations.

Figure 4:
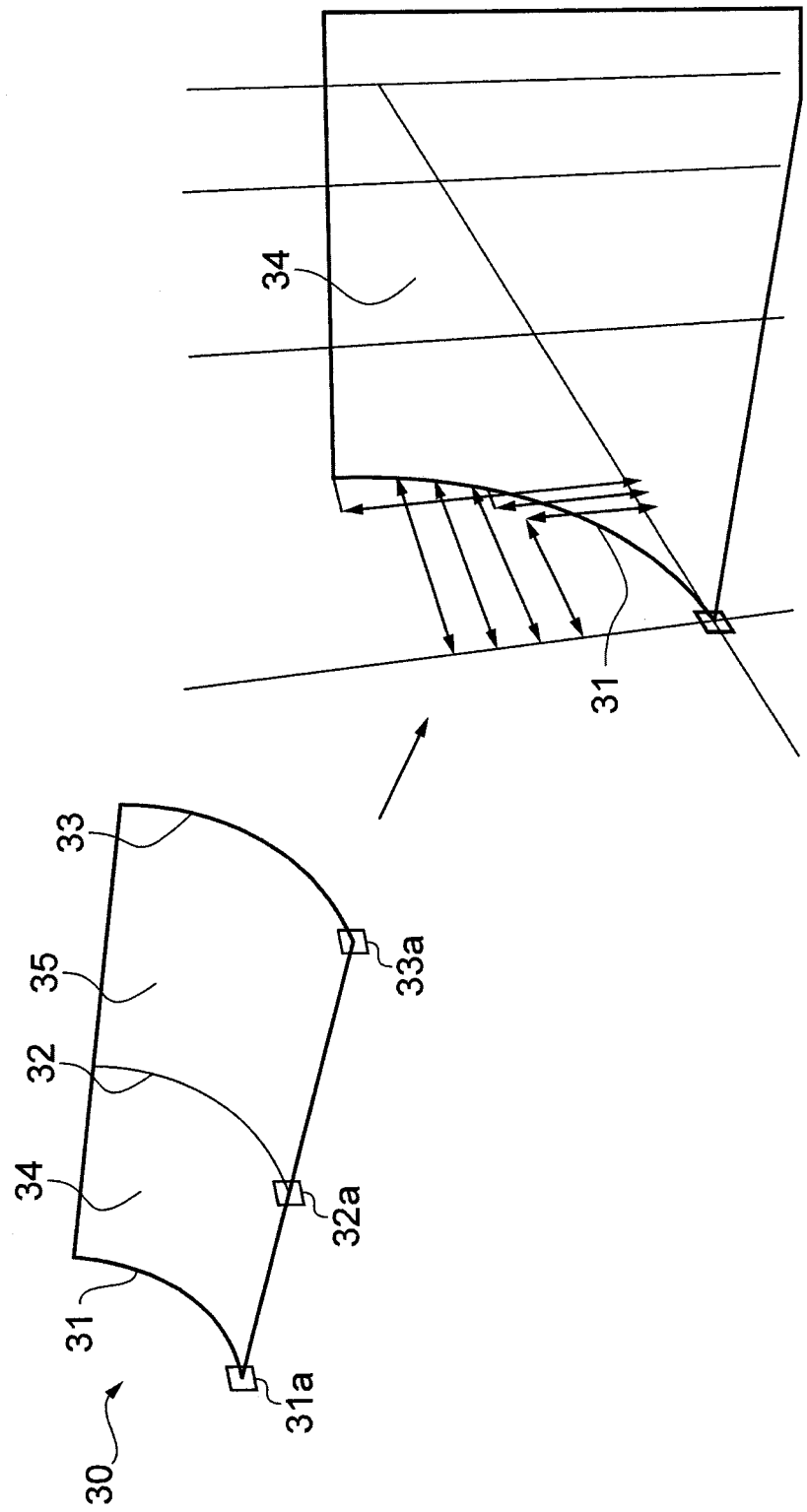
FIG. 4 shows the restrictions imposed a 3D FFD lattice when used with a design table integration of 2D profiles.

A three-dimensional lattice can be used to encapsulate all the profiles. However, as the FFD is performed in a separate program from CATIA (e.g. MATLAB), the lattice needs to stay aligned with the sketch planes to enable the deformed design to be re-integrated with CATIA. Consequently, lattice node movements need to be restricted to lie within these planes. This is illustrated in FIG. 4 which shows a surface 30 comprising three 2D curves 31-33 which lie on planes 31a-33a respectively. The space 34, 35 between the curves 31-33 is interpolated to complete the structure of the surface 30. Lattice nodes (not shown) can be defined on each of the 2D curves 31-33. These lattice nodes must only be deformed in their respective planes—that is, the lattice nodes cannot be moved into the interpolated regions 34, 35 between the curves 31-33. Therefore, restrictions are imposed on their movement. As an alternative to using a three-dimensional lattice, it would also be possible to use a sequence of two-dimensional FFD operations in parallel (one for each loft profile). This would eliminate the need to impose restrictions on the lattice node movements as the lattice node movements are already implicitly restricted. The disadvantage is that this would produce an increase in the number of design variables.

If the geometry is constructed via only two lofting profiles, such as the geometry used in Menzel, S., Olhofer, M., and Sendhoff, B., "Application of Free form deformation techniques in evolutionary design optimisation," *6th World Congress on Structural and Multidisciplinary Optimization*, AIAA, Rio de Janeiro, Brazil, 2005 (Menzel et al), it is more efficient to use two two-dimensional FFD parameterisations. However if the construction consists of more than two profiles, then using a 3D lattice allows any deformation to be smoothly spread over the construction profiles, whereas the use of 2D FFD produces independent deformations.

The main limitation of this type of parameterisation is that the design process allows no control over the surface between the lofting profiles. Splines can be used as guide curves between lofting profiles, but in practice the limitations on the degree of curvature that the guide curves can have limits any usefulness except to maintain a smooth edge transition. The restrictions on the 3D lattice node movement limits the type of geometries that it is possible to create. This limitation is addressed with the IGES file integration approach. An advantage that this type of integration has over the use of IGES files is that one design table can contain numerous designs, whereas an individual IGES file is needed for each design. Each row of the design table is able to contain the co-ordinates of all the spline construction points within a design. The advantage of this is that it enables the engineer to quickly visually compare the types of designs that the optimisation process is generating.

B. IGES Integration

The IGES standard is a commonly used data format that enables the exchange of information from one CAD system to another. IGES files take the form of text files in ASCII format. The IGES format can be exploited in order to integrate the CAD package with the FFD methods. Within the CAD software just the surface to be optimised can be exclusively exported in the IGES format. Within CATIA this is achieved by hiding all but the target surface: only geometry in the 'visible' space is exported. Using knowledge of the IGES structure, a script can be written to read an IGES file and extract the information relating to any rational B-spline surfaces. Within the IGES format, Rational B-Spline surfaces take the following form:

$$X(s,t) = \frac{\sum_{i=0}^{l}\sum_{j=0}^{m} W(i,j)P(i,j)Bi(s)Bj(t)}{\sum_{i=0}^{l}\sum_{j=0}^{m} W(i,j)Bi(s)Bj(t)} \quad (8)$$

Figure 5:
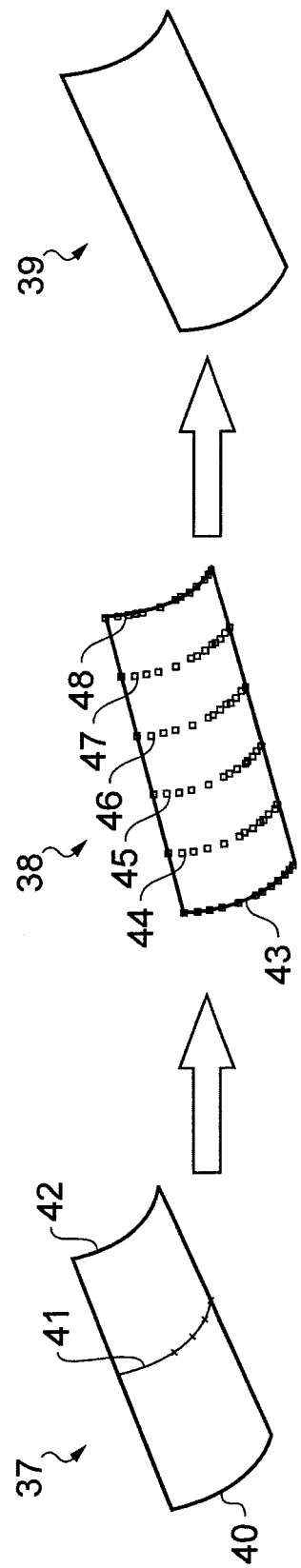
FIG. 5a shows a simple CATIA (Computer Aided Three-Dimensional Interactive Application) surface by lofting through spline profiles.
FIG. 5b shows the corresponding IGES construction points in MATLAB.
FIG. 5c shows the MATLAB reconstructed surface.

The information captured by the script developed here comprises first and second knot sequences, weights and control point co-ordinates. Using Equation (8) above, it is possible to recreate the surfaces within an external program such as MATLAB, although this is not necessary to integrate the FFD methods. Deformation of the surface can be achieved by using a three-dimensional lattice to encapsulate the surface construction points. In this way only the surface construction point co-ordinates are altered. Neither the construction point weights nor the knot vectors are considered. As the FFD lattice is deformed the construction points move. The resulting construction point positions can be written back to the IGES file using a similar script to the IGES import script described above. The use of FFD techniques to parameterise the surface construction points in this manner is similar to how the design table CAD integration method parameterises the spline construction points. If the IGES files are used like this with a lofted surface, it is essentially equivalent to increasing the number of lofting profiles and thereby increasing the amount of control of the surface. This can be seen in FIGS. 5a-c, which shows the CATIA model of a lofted surface 37 (FIG. 5a), the surface construction points 38 in MATLAB (FIG. 5b) and the reconstructed surface 39 within MATLAB (FIG. 5c). The CATIA model has 3 lofting profiles 40-42 while the MATLAB construction points make up the equivalent of 6 lofting profiles 43-48.

The limitations on the lattice node movements seen for the design table integration method are not present when using IGES files, as the surface construction points are free to move within the 3D space. This enables a greater range of geometries to be produced. However, maintaining continuity with the undeformed CAD surfaces is more complicated and boundary node movement constraints are needed (see below).

The main advantage of this method over the design table integration is that the deformed surface is independent of the construction method. The FFD lattice can also be laid over CAD surface joins allowing the optimisation of arbitrary surface selections. However the more IGES surfaces are used, the more complicated it becomes to manipulate the data set. It is also important to note that for ruled surfaces it is the boundary curves that need to be parameterised, not the surface construction points themselves.

Of the two methods outlined, it is recommended that for simple geometries built with two spline profiles the design table integration method coupled with 2D FFD parameterisation is the most appropriate solution. For complex geometries the IGES integration with 3D FFD techniques provides a more flexible representation, and therefore a more successful parameterisation. It is notable that both integrations can be used with any of the FFD techniques discussed in 'Background Of The Invention' above and that the selection of the most appropriate method is problem specific.

Continuity

Figure 6:
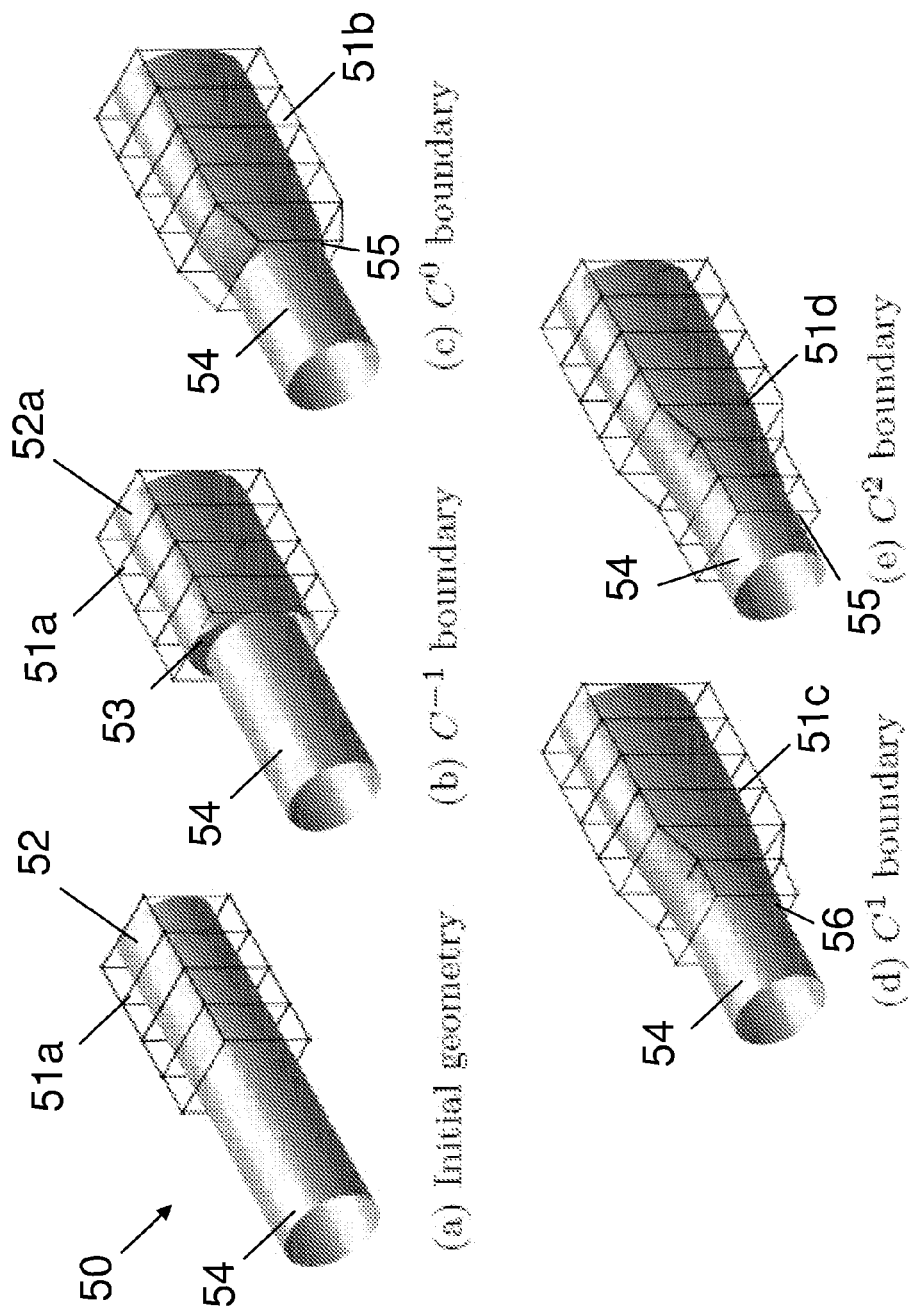
FIGS. 6a-e illustrate a method of controlling continuity over an FFD lattice boundary.
Figure 7:
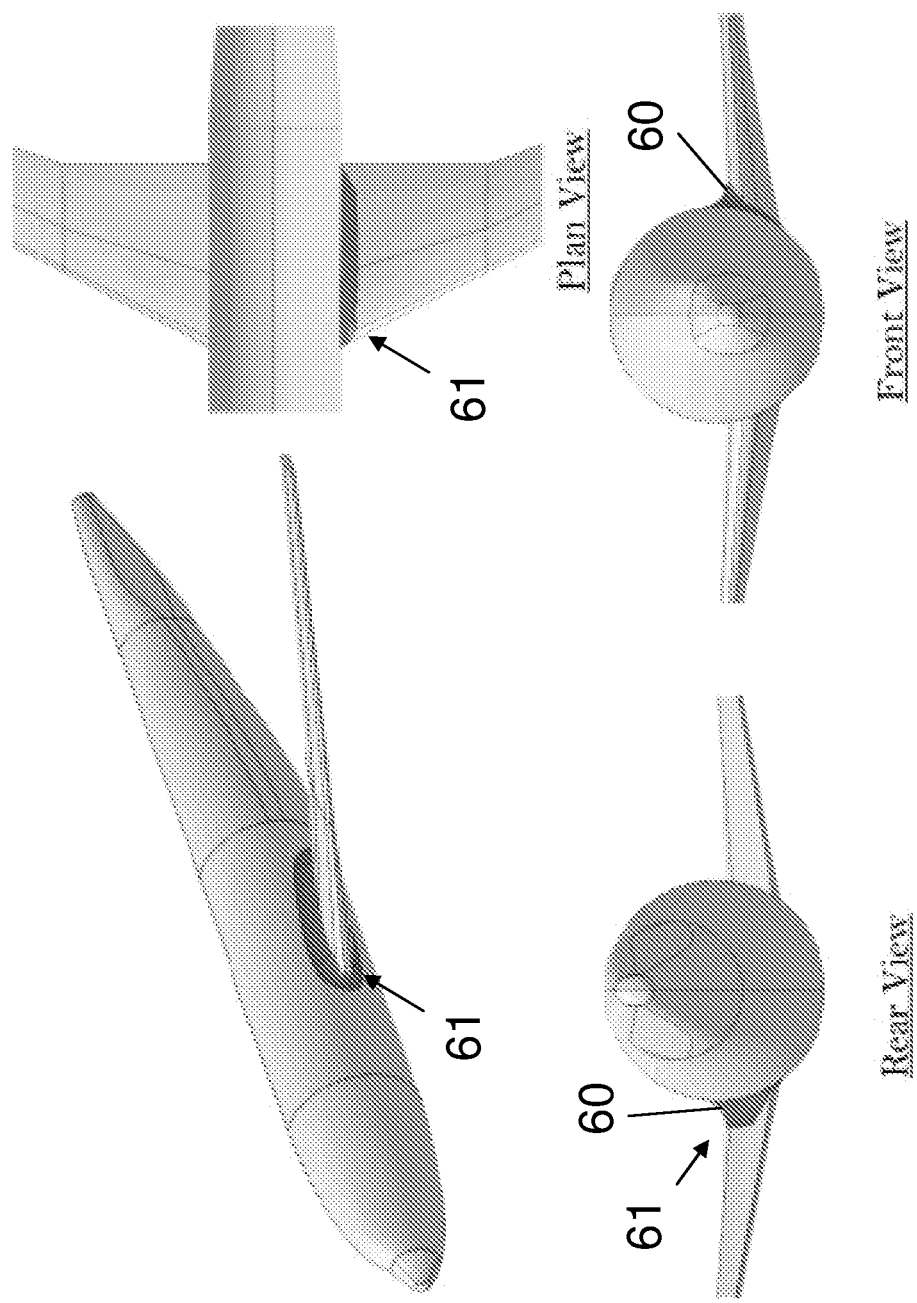
FIG. 7 shows the wing body construction of the DLR-F6 (German Aerospace Center design designation F6) geometry with a simple circular arc wing-fillet.

An important aspect when considering a local shape parameterisation technique is its ability to maintain continuity between the surface to be optimised and any adjoining surfaces. Sederberg and Parry showed that the conditions required to maintain $C^k$ continuity (C stands for continuity) over the boundary are that the lattice nodes on k planes adjacent to the boundary are not moved. FIGS. 6a-e show an example of how this can be adopted to achieve a $C^2$ continuous connection along one co-ordinate direction. A simple base geometry of a cylinder 50 (see FIG. 7) is deformed using FFD lattice 51a to enlarge the diameter of one half 52 of the cylinder 50. FIG. 7 shows the simplest FFD lattice 51a to achieve this. Lattice 51a disregards boundary continuity and hence a separation occurs at the boundary 53 between the enlarged half 52a and the un-deformed half 54 of the cylinder 50. FIGS. 6(c)-(e) show the FFD lattices 51b-d required to produce $C^0$ to $C^2$ continuous boundaries and the resulting geometries. To achieve this a plane 55-57 of undeformed control points is added to each FFD grid 51a-c respectively. This is equivalent to appending the original FFD lattice (here termed the "active" lattice), with another undeformed lattice, (here termed the "continuity" lattice), at the boundary requiring continuity control. Obviously this method can be used to achieve continuous boundaries with surfaces to all faces of the FFD lattice.

Case Study

In order to examine the practicalities of implementing the proposed FFD parameterisation and CAD integration methods, the set-up and initialisation of a case study is presented. As discussed above, the ultimate aim of this case study is the aerodynamic optimisation of a faring placed around the wing-fuselage junction (termed the "wing-fillet") of a typical transonic passenger aircraft. This case study has been chosen as it requires the manipulation of a complex geometry with numerous geometrical constraints to test the proposed methodology. It is also an area of the flow field within which improvements may be possible.

A. Optimisation Objectives and Constraints

This case study aims to minimise the total drag experienced by the aircraft by only manipulating the shape of a wing-fillet. Each design is subject to the following aerodynamic constraints:

1. Angle of attack (AoA): 1 degree; and
2. Mach number, M=0.75.

These constraints are the design cruise conditions for the unfaired configuration of the selected geometry. Geometric constraints are applied to the problem via the upper and lower bounds of the design variables such that:

$$0 \leq \{D\text{var}\} \leq 1 \qquad (9)$$

where Dvar defines a vector of normalised design variables.

B. Geometry

Figure 8:
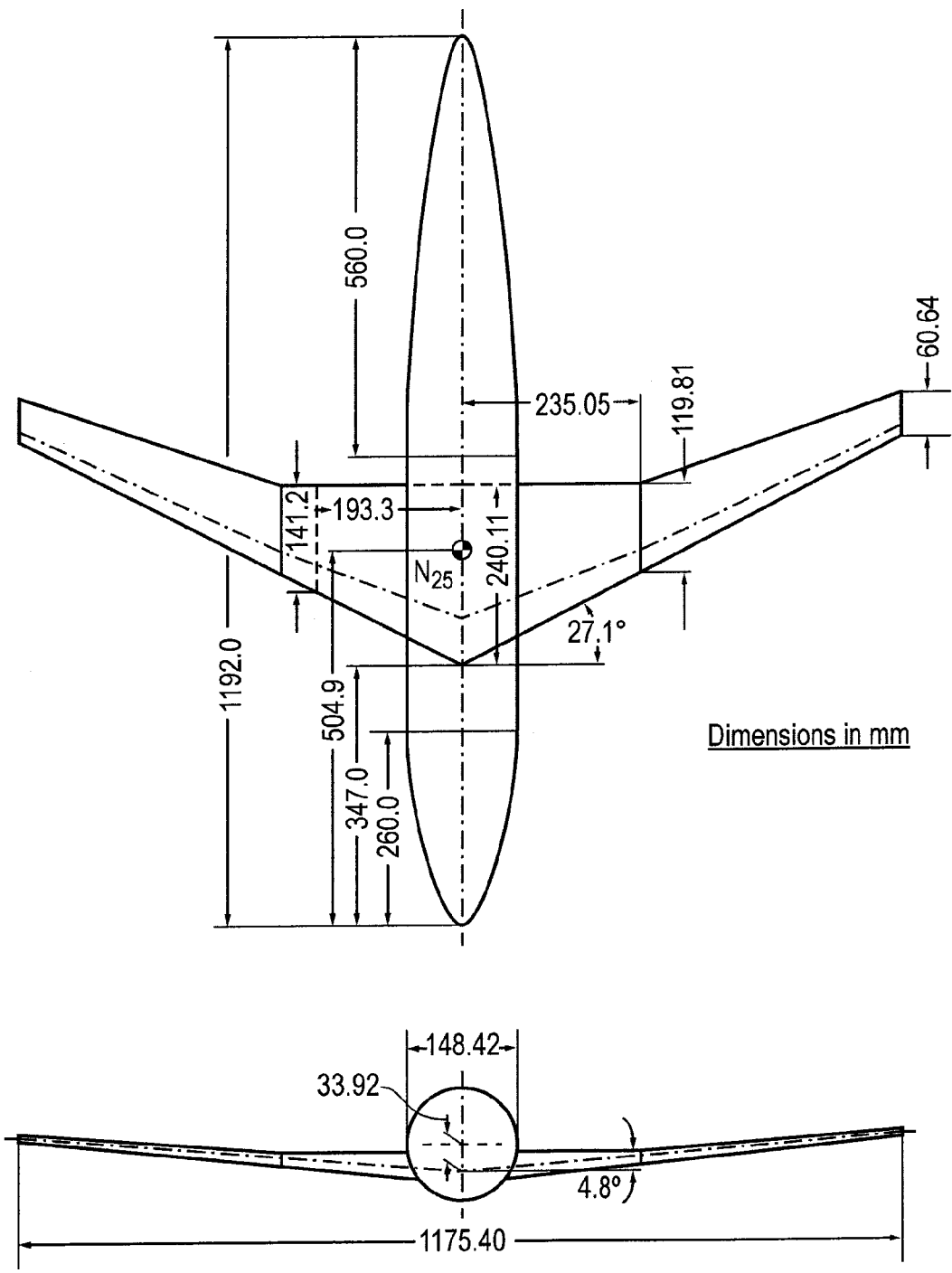
FIG. 8 provides details of the size of the DLR-F6 geometry.

The base geometry selected for this study is the wing-body configuration of the DLR-F6 as used in the AIAA (American Institute of Aeronautics and Astronautics) second drag prediction workshop [AIAA, *Second drag prediction workshop*,] (see FIG. 7). The DLR-F6 geometry was selected as it represents a fairly modem aircraft geometry for which experimental wind tunnel data is widely available. The DLR-F6 geometry is a modification of the DLR-F4 with the aim of reducing the boundary layer separation at the rear upper wing surface. The base CATIA model was achieved by reconfiguring the IGES model made publicly available by ONERA (the French Aerospace Lab) for the second drag prediction workshop to the wing body configuration. The nacelles and pylons were removed to simplify the CFD analysis within the optimisation process. The DLR-F6 base geometry does not contain any type of wing-fuselage junction fairing. Details of the size of the DLR-F6 geometry can be found in FIG. 8. The properties of the DLR-F6 geometry are given in the table shown in FIG. 9.

1. Wing-Fillet Geometry Construction

Raymer states in Raymer, D. P., "*Aircraft Design: a conceptual approach*", AIAA, 2006 that:

"to increase aerodynamic efficiency the wing-fuselage connection of most aircraft is smoothly blended using a wing-fillet. A wing-fillet is usually defined by a circular arc of varying radius, tangential to both the wing and fuselage."

The combination of the initial wing-fillet geometry and deformation method needs to be able to generate such a shape whilst maintaining the flexibility to generate new radical geometries. Referring to FIG. 7, a circular arc 60 of constant radius is used as an initial base geometry for the wing fillet 61. As discussed above, the construction method of the wing-fillet 61 has an impact on the most applicable integration method and consequently on the outcome of the optimisation study. Here, the geometry was created using the CATIA "loft" function.

In order to generate the flexible representation needed, the wing-fillet 61 was constructed from surfaces superimposed on top of the initial base geometry. This enables a greater range of deformations than the alternative of embedding the wing-fillet within the base geometry. It also ensures that the designs of the fuselage and the wing remain undisturbed.

Figure 10:
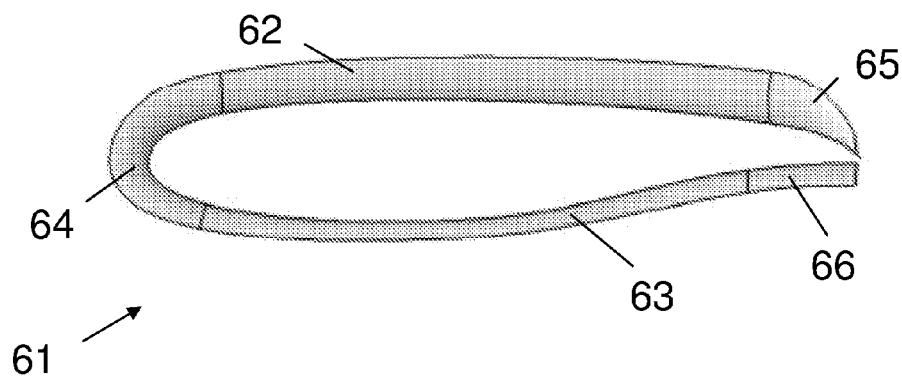
FIG. 10 shows an initial wing-fillet construction consisting of five separate sections.

As shown in FIG. 10, it was decided to construct the wing-fillet 61 in five distinct sections. The five separate surfaces are as follows: the upper surface 62, lower surface 63, leading edge 64, upper surface trailing edge 65 and lower surface trailing edge 66. This increases the flexibility of the design and enables a more detailed individual analysis of each section if necessary.

The wing-fillet 61 is constructed using spline profiles that are equally spaced around the wing-fuselage junction line and are positioned on a plane which is normal to the wing-surface. The spline profiles are each defined by four construction points and are constrained to be coincident and tangential to both the wing-surface and the plane tangential to the fuselage. The initial spline construction points are set to lie on an arc of constant radius, R=5 mm. The wing-fillet surfaces are created by lofting through the spline profiles using two guide splines to ensure that connection with the wing and fuselage is achieved. The two guide curves are created by interpolating the profile start and end points respectively using the appropriate surface as a basis.

C. Simplified Model

After completing an initial CFD validation study on the DLR-F6 model, it was clear that any subsequent optimisation study would be limited by the CFD evaluation time and so it was therefore desired to develop a simplified model to reduce the CFD evaluation time.

Figure 11:
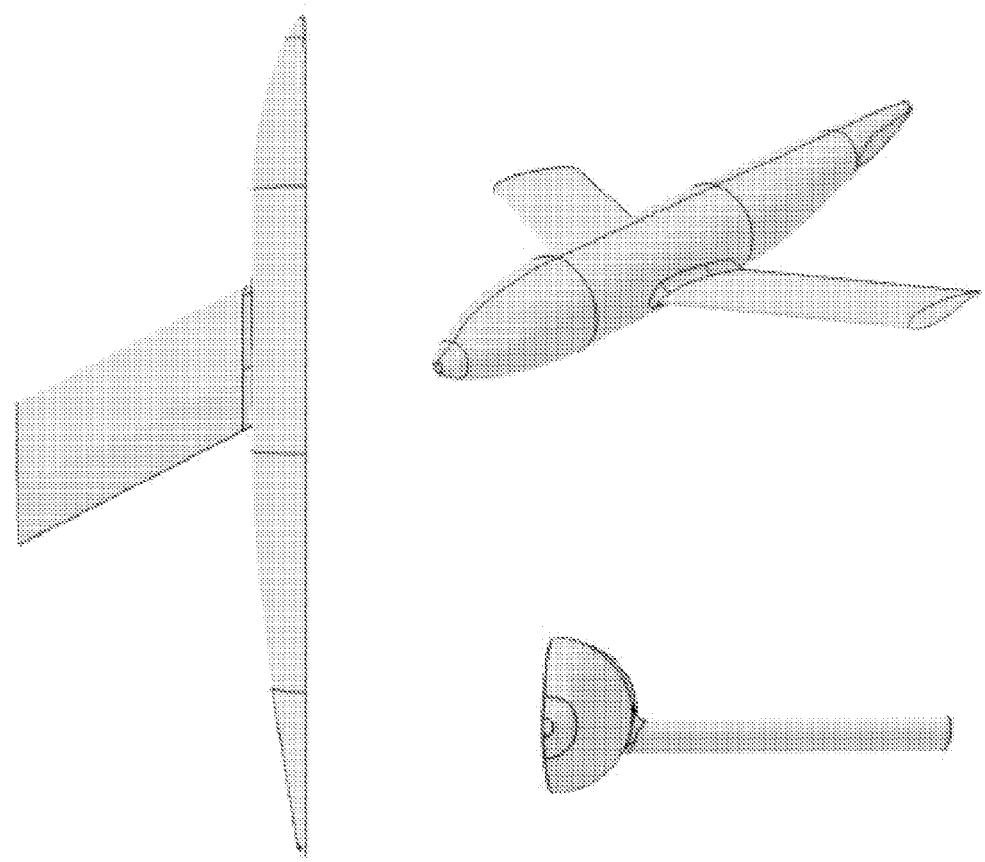
FIG. 11 shows the DLR-F6 geometry with a simplified wing.

The simplified model consists of a modified wing attached to the DLR-F6 fuselage. The fuselage is unaltered to maintain realistic boundary layer growth, which is a significant factor in the fluid behaviour in the wing-fuselage junction region. The new wing has been created with no twist, taper or dihedral (see FIG. 11) and is generated by extruding the original wing profile at the wing-fuselage junction to a distance of twice the section chord length. During the CFD process a mirror plane is placed at the wing tip to eliminate any wing-tip effects. The refined region of the CFD mesh normally needed to capture such fluid behaviour is then redundant and can be omitted from the simplified model CFD mesh. As a consequence of simplifying the model the size of the CFD mesh required following mesh independency checks is reduced to approximately 2.5 million cells, producing a significant reduction in the computing time needed. This provides a balance between the detail and speed of the optimisation study to conduct a search for the best possible design.

D. Geometry Parameterisation

Figure 12:
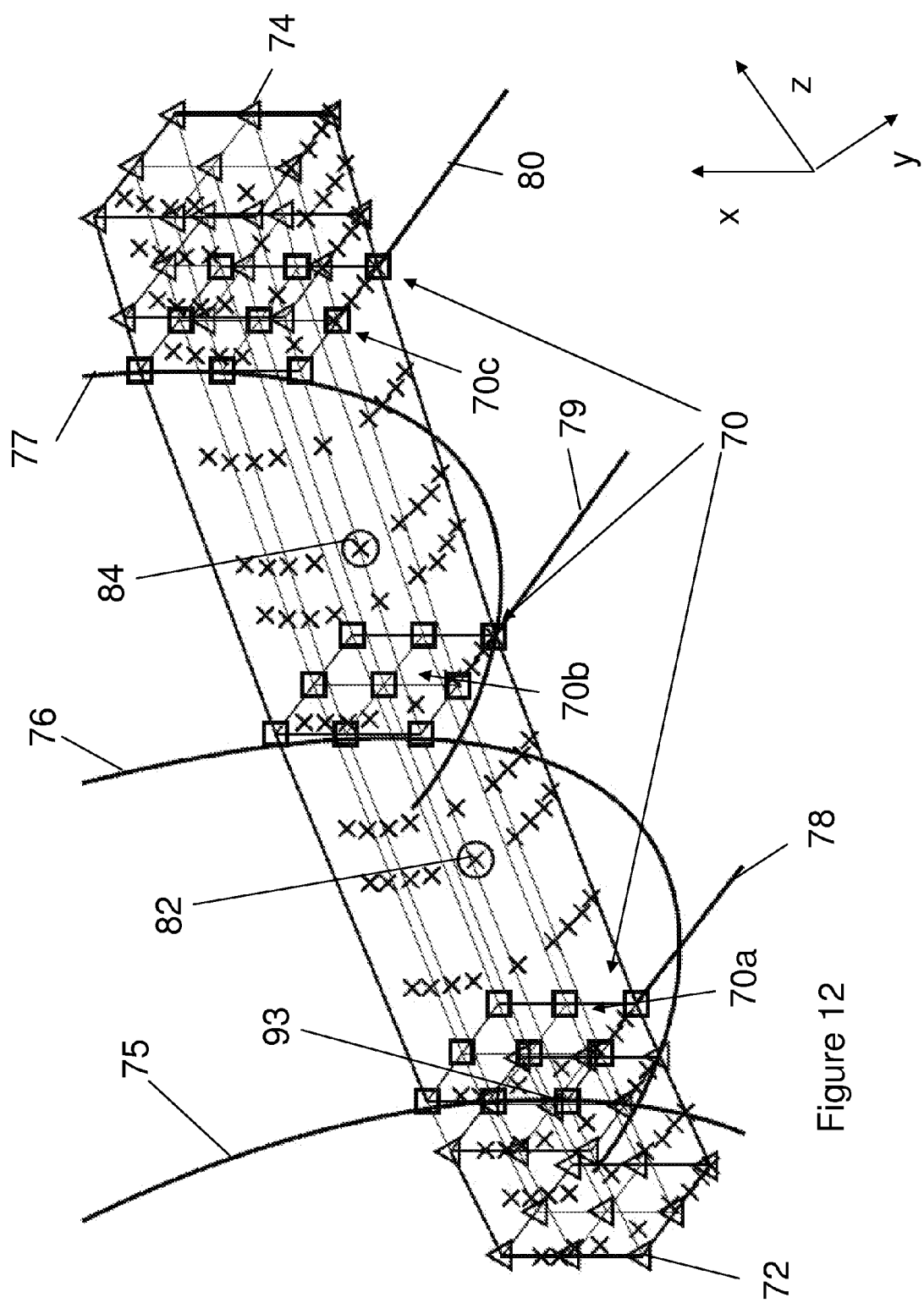
FIG. 12 is a schematic perspective view of the wing fillet, showing an initial 3D FFD lattice, construction points and wing upper surface and fuselage constraint curves.

The geometry parameterisation is most clearly explained with reference to FIG. 12. To begin with only the wing-fillet upper surface is manipulated. This enables the outlined methods to be examined without the added complication of the geometry restrictions that need to be applied to the leading and trailing edges to maintain continuity. This initial study selects a relatively coarse active lattice 70, the nodes of which are represented by squares on FIG. 12, which has 3 planes in each of the x, y and z directions. In this case, the active lattice can be thought of initially as comprising three substantially parallel planes 70a, 70b and 70c, each comprising 9 active lattice nodes. The active lattice 70 is appended at either end in the y-direction by 3×3×3 continuity lattices 72, 74, the nodes of which are represented by triangles on FIG. 12. The x's in FIG. 12 refer to the wing fillet upper surface IGES construction points.

As discussed above, the nodes of the continuity lattices 72, 74 are fixed in the 3D space in order to maintain $C^2$ continuity with the other wing-fillet surfaces. To ensure a continuous connection between the fuselage, wing and wing-fillet, movement of the lattice nodes on these boundaries is suitably restricted. To achieve this, the fuselage main section and wing surfaces are generated within MATLAB and are used to create boundary curves 75-80. The fuselage boundary curves 75-77 are the 2D lofting profiles used to produce the fuselage main section. The wing boundary curves 78-80 are produced by interpolating points projected onto the wing surface. Each active lattice plane 70a-70c lies on two boundary constraint curves (for instance, active lattice plane 70b lies on boundary constraint curves 76 and 79). Movements of the active lattice nodes which lie on these boundary curves 75-80 are restricted to movements along those respective curves 75-80.

The inner-most node of each of the active lattice planes 70a-70c (for instance, node 93 of active lattice plane 70a in FIG. 12) has a fixed position relative to its associated boundary node constraint curves. Moreover, the separation distance between each adjacent lattice node is kept equal within each active lattice plane 70a-70c. This allows a design variable to be defined for each of the boundary curves, each design variable describing the extent to which the associated active lattice plane is stretched along that particular boundary curve. The target position for each of the active lattice nodes on the boundary curves is calculated via the parametric equations of the boundary curves. As well as maintaining continuity, this method also reduces the number of design variables for the problem.

In addition to the position of the active lattice nodes along their constraining curves, the other design variables required are the co-ordinates of the target position of direct manipulation (DM) points placed on the wing-fillet surface. The position and number of direct manipulation points are also part of the FFD parameter survey. Initially two direct manipulation points 82, 84 are used that are equally spaced along the mid-chord of the surface. Each direct manipulation point is free to move within 3D space. However, the movement of the DM points 82, 84 is restricted by the design variable range set for each co-ordinate during the optimisation process. These ranges are selected such that, in the z-direction, the direct manipulation points cannot breach adjacent active lattice planes (for example, DM point 82 cannot breach active lattice plane 70b in the z-direction). This is a restriction imposed by the direct manipulation technique. In the x and y directions movement of the DM points is limited by the fuselage and wing surfaces (i.e. the boundary curves) and hence the range minima are set as such. As described above, the deformation that needs to be applied to the active lattice to account for the DM point design variable is calculated using a slight alteration to the explicit direct manipulation solution Hu et al developed. This is explained in more detail below.

The initial study thus uses a total of twelve design variables (six boundary node positions and x, y and z co-ordinates for each of the two direct manipulation points) to describe each new design. These design variables describe the way in which the initial lattice (and thus the initial geometry) is deformed to obtain the new design. Effectively, two successive deformations are applied. Firstly, the six boundary curve design variables scale the size of the active lattice, allowing the size of the wing-fillet along the surface to vary. Secondly, further deformations are applied to the active lattice based on the DM point design variables, allowing bumps/divots to be induced along the surface.

Figure 13:
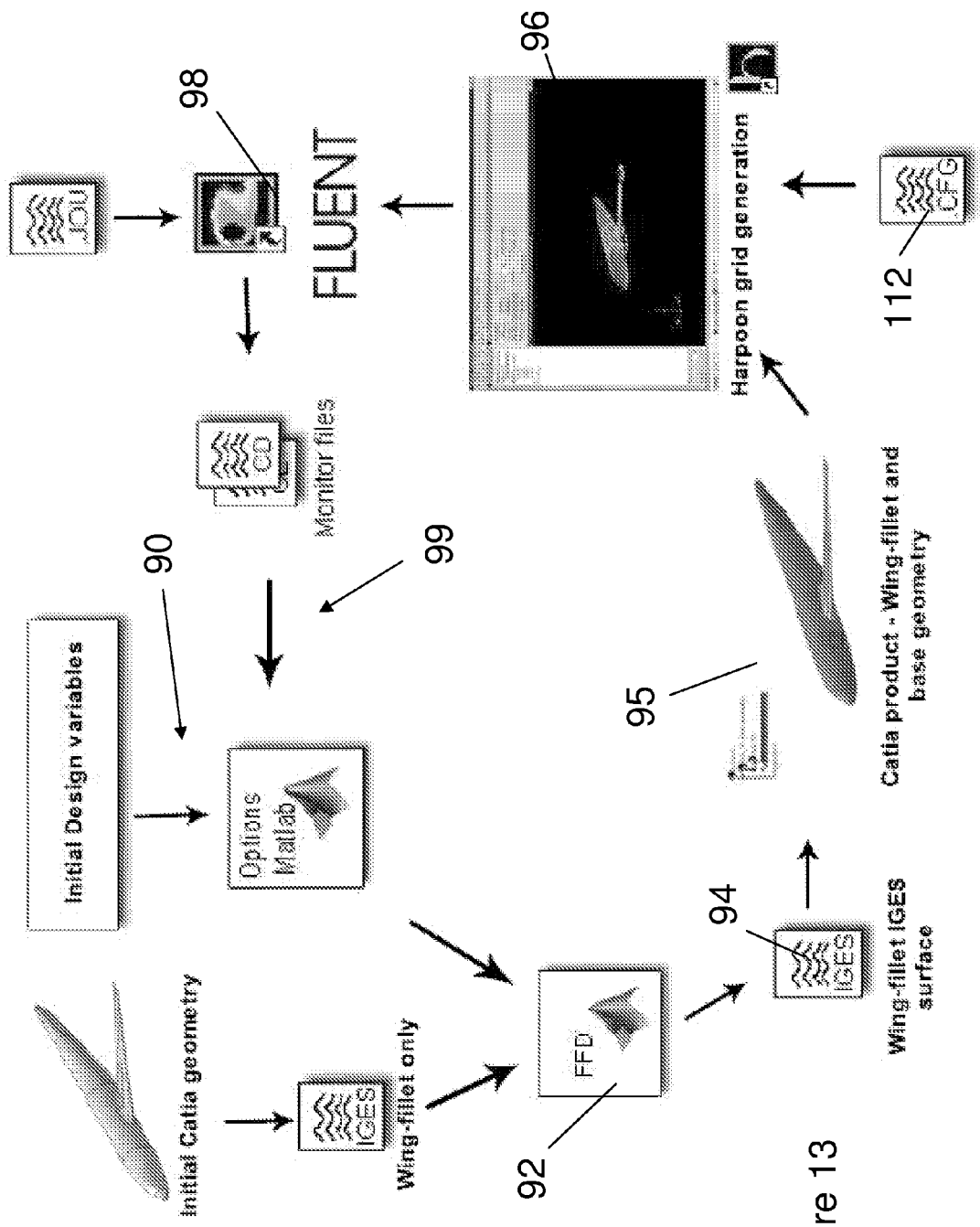
FIG. 13 is a flow chart of the full analysis process of a design point.

Referring now to FIG. 13, using the above FFD parameterisation, the full analysis of each optimisation design point consists of the following procedure:

At step 90, the initial twelve design variables are input to the OPTIONS optimisation framework in MATLAB (see below).

The design variables are then decoded in step 92 (i.e. the FFD stage). Design variables are initially defined as a normalised vector between 0 and 1 (see equation 9). Decoding is required to convert this normalised vector to 'real' values which relate to lattice deformations;

The required lattice node deformations are also calculated in step 92 (i.e. the FFD stage). As discussed above, two successive deformations are applied to the active lattice 70. First, the active lattice planes 70a-c (and thus the active lattice 70) are scaled using the boundary curve design variables. Next, using the scaled active lattice, a pair of chunks 86, 88 (see FIG. 13) are defined between the pairs of adjacent active lattice planes 70a-70b and 70b-70c. These chunks 86, 88 are defined using chunk nodes (not shown) which are the same in number and have the same initial positions as those in the scaled active lattice planes. The chunks are then deformed using the DM point variables (according to the slight alteration to the explicit direct manipulation solution Hu et al developed as described above). The positions of the deformed chunk nodes are then translated onto the active lattice planes, thus applying a second deformation to the active lattice planes 70a-70c (and thus the active lattice 70).

The geometry is also deformed during step 92 (i.e. the FFD stage). The wing fillet IGES surface is exported from the initial CATIA geometry into MATLAB for deformation in this step using the deformed active lattice positions to produce a new wing fillet IGES surface;

CATIA model update. The deformed wing fillet IGES surface 94 is output from the FFD process 92. This new wing fillet IGES surface is combined with the base geometry to produce the CATIA product of the wing fillet and base geometry in step 95. Note that the CATIA (or CAD) model is thus effectively deformed here using FFD. This differs from the typical prior art optimisation technique described in 'Background Of The Invention' which involves deforming the CFD mesh using FFD. The advantage of this new technique is that the CATIA (or CAD) model is output directly and precisely from the optimisation process and that no potentially inaccurate reverse engineering techniques are required to obtain the CATIA (or CAD) model from an optimised CFD mesh (as required in existing processes);

CFD grid (or mesh) production. This is done in a commercially available CFD grid generation package such as Harpoon in step 96. A CFD grid is produced from the CATIA product of the wing fillet and base geometry. This will be explained in more detail in subsection G below; and CFD analysis of the CFD grid. This is done using a commercially available CFD simulation tool such as FLUENT in step 98 to produce a measure of the fluid dynamic performance of the geometry, such as drag count or lift coefficient. This is explained in more detail in subsection H below.

Each design considered in the optimisation framework is processed in this way and its suitability is judged on the output from the CFD analysis. The optimisation strategy will be explained in more detail in subsection F below.

E. CAD Communication

CATIA V5 is an object-orientated CAD package that exposes a large number of objects to external applications.

In order to integrate CATIA within an optimisation loop it must be run in batch mode. For this case study a .CATSCRIPT file was developed that opens an existing product containing the DLR-F6 geometry as an existing component. As discussed briefly above, in step 95 in FIG. 13, the deformed IGES wing-fillet is imported as a new component, the CATIA "Split" command removes the excess wing and fuselage surfaces and finally the entire product is exported as an IGES file ready for grid generation. The excess surface is the fuselage and wing surface that the new wing-fillet is laid over.

F. Optimisation Strategy

Figure 14:
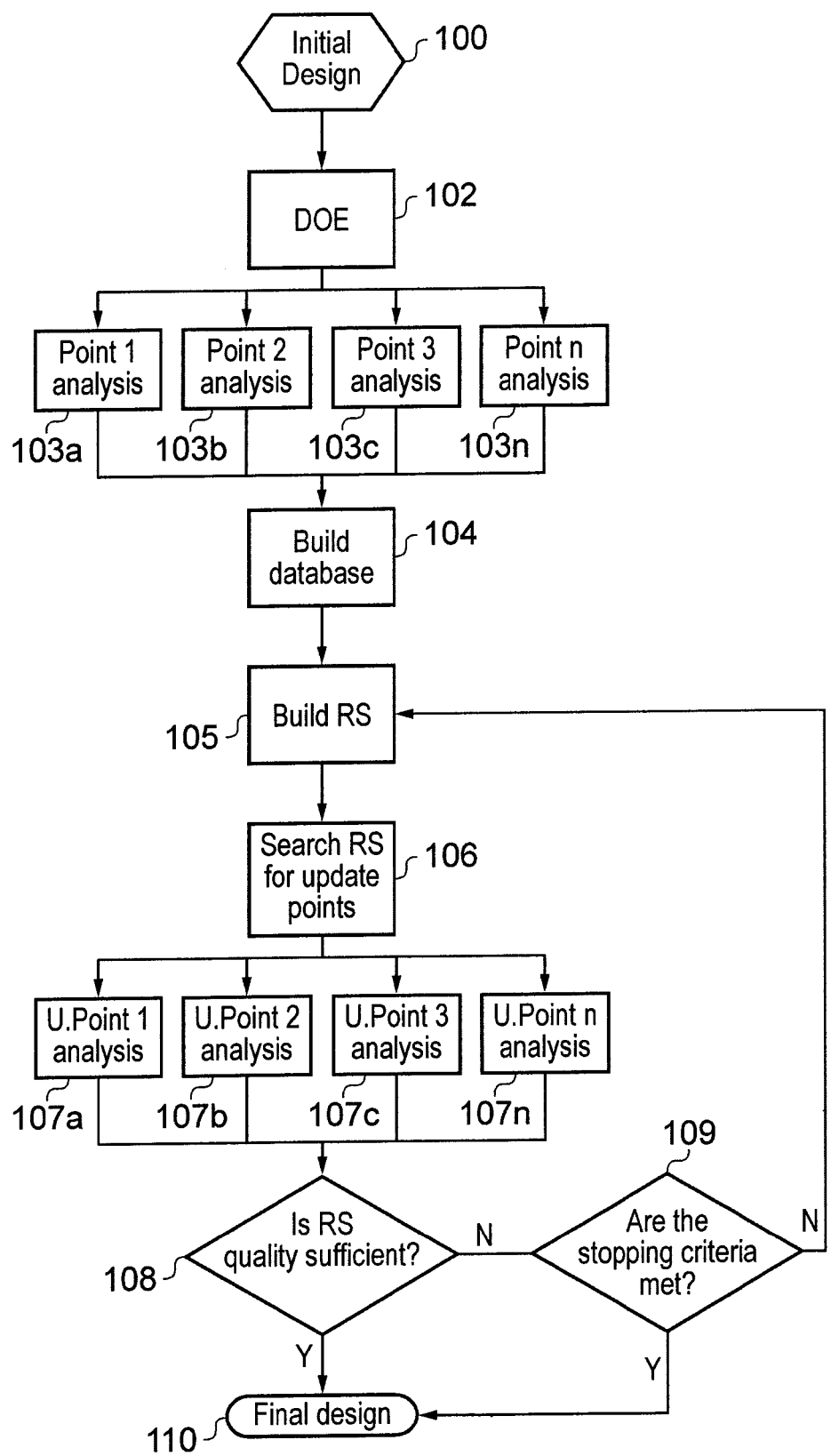
FIG. 14 is a flow chart illustrating an optimisation strategy which involves building an interpolated response surface.

The geometry parameterisation technique outlined above is integrated within the optimisation framework OPTIONS which is performed in MATLAB. The particular optimisation strategy used in this case study is illustrated in FIG. 14. Firstly, in step 100 the initial design is constructed and the FFD parameterisation described above is performed. Next, in step 102, the optimisation strategy incorporates a design of experiments (DOE) which is intended to produce an initial database (in step 104) of n (n being a user defined number) alternative designs which together cover as much as possible of the design space encompassing all of the potential design points. This ensures that the designs in the database are not unnecessarily clustered together in the design space, thus making the analysis as broad as possible. Many types of DOE techniques are available with varying space filling properties. Here the Latin Hypercube method is used as it has been shown to provide a near uniformly distributed set of control points with a degree of stochastic positioning. However, it will be appreciated that other suitable DOE techniques may be used.

In steps 103a-n, a design point full analysis (see subsection D and FIG. 13 above) is performed on each of the designs proposed in the DOE step 102 either simultaneously or sequentially. The results of the CFD analyses are stored, along with the potential designs, in the database in step 104. On top of this initial database a response surface (RS) model is created in step 105. This is a type of curve fitting (or interpolation) technique used to approximate a measure of the fluid dynamic performance of the design, such as its CFD drag coefficient ($C_D$, where $C_D$ as used herein stands for drag coefficient), for any combination of design variables in the design space based on the results of the CFD analyses performed in steps 103a-n. By choosing DOE geometries that are spaced apart in the design space, a broader RS is produced.

Evaluation of the RS can thus be used in lieu of a full CFD analysis for each point on the design space. A numerical search technique (e.g. a genetic algorithm) is used to locate a group of n (n being a user defined number) potentially optimal designs on the RS model at step 106. However before an optimum design can be accurately located and output from the process, the RS is subjected to a series of quality analysis procedures in step 108. These procedures evaluate the quality of the RS as a representation of the actual design space. The RS may potentially be inaccurate in places where, for example, significant interpolation has been carried out between the designs evaluated calculated in steps 103a-n (or indeed at steps 107a-n) which can be relatively distant from each other in the design space. In steps 107a-n, full CFD analyses are performed on the n potentially optimal designs identified in step 106. Assuming the RS was found to be of insufficient quality in step 108, the RS is then updated in step 105 with the results of these additional CFD analyses to improve its resolution and its accuracy. This loop is repeated until an RS of sufficient quality is produced and an optimal design is identified at step 110. As the design space is unlikely to have been modelled to a sufficient level of accuracy during steps 102-105, full CFD analyses are typically performed on the n possible optimal designs before the checking procedure is performed for the first time in step 108 as indicated in FIG. 14. Alternatively, step 108 may be performed before steps 107*a-n* to prevent the need for additional CFD analyses to be performed when the RS is of sufficient quality. Note that, in this case, the optimal geometry identified at step 110 may not necessarily be one of the geometries produced and analysed in step 103 or step 107 as it may be inferred directly from the response surface. In both cases, an additional step 109 is included in the loop return path between steps 108 and 105 to prevent the program from entering an infinite loop. Checks are performed here to keep track of how many times the loop has been processed and whether each subsequent loop yields any improvement in the accuracy of the RS.

As an alternative to the above optimisation strategy, the geometry may simply be optimised by repeating the procedure illustrated in FIG. 13 (which describes the full analysis of each optimisation design point) sequentially, in each case altering the proposed geometry based on the results of the analysis of the previous geometry. In this case, the geometry would be iterated in this way until a sufficiently optimal design is identified.

G. Mesh Generation

The mesh generation package Harpoon v3.0a19 is used here to produce the CFD mesh in step 96 (see FIG. 13) for each new design. Harpoon is an automated application, that can produce hex dominant meshes at up to 2+ million cells/minute on some PCs. Although it is possible to use FFD methods to manipulate the CFD mesh, thereby eliminating the need to produce a new CFD mesh for each design, to do this in parallel with the geometry is not trivial. The complication arises as it is necessary to ensure the geometry produced by the CAD package is accurately described by the CFD mesh. In particular the ability to vary the global size of the wing-fillet would be complicated, as this would require an FFD grid to be produced around the entire CFD mesh rather than just the wing-fillet. The speed at which Harpoon is capable of creating an adequate 3D CFD mesh when compared to the time for the CFD analysis is however insignificant for three-dimensional studies. A five million cell mesh can be created in 229 seconds, whereas the CFD solve takes approximately 10 hours.

Harpoon generates the new CFD mesh while running in batch mode from Harpoon configuration files. MATLAB is used to update the configuration file 112 for each new design to point to the exported IGES geometry. Within Harpoon, mesh size control is achieved by setting a global base size, surface size, an expansion rate and if necessary a maximum cell size. Harpoon creates a mesh by initially meshing the geometry surface using the surface base sized elements and then grows the volume mesh away from this surface towards the outer boundaries expanding the element size as it is grown.

Figure 17A:
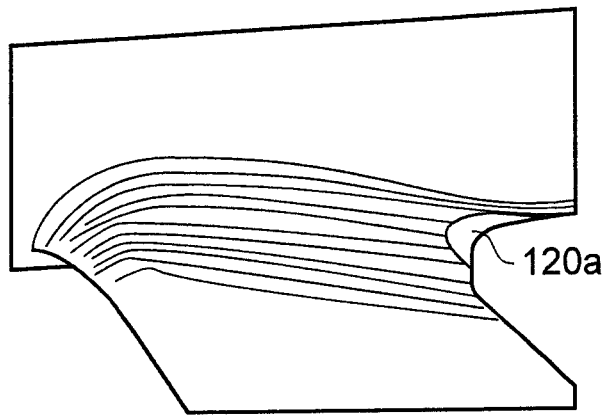
FIGS. 17a-c show design plots of the CATIA model, pressure contours with surface restricted streamlines and a detailed view of the flow lines in the wing-fillet region respectively for the designs on the Pareto front of FIG. 16.
Figure 17B:
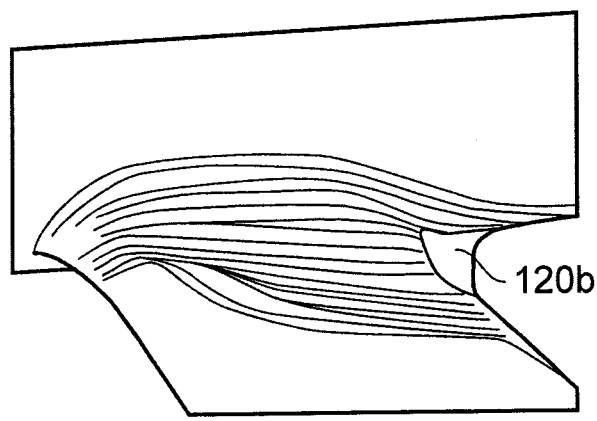
Figure 17C:
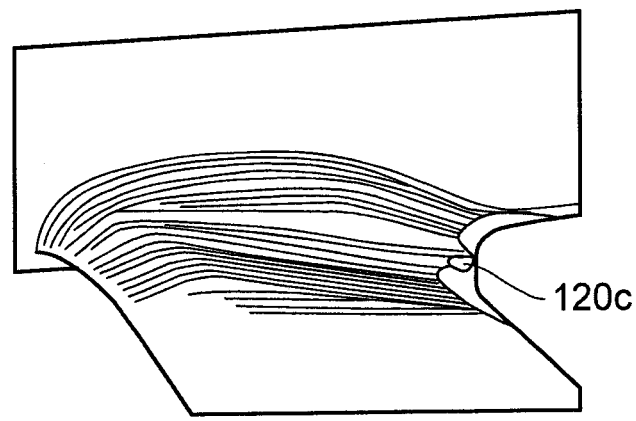
Figure 18A:
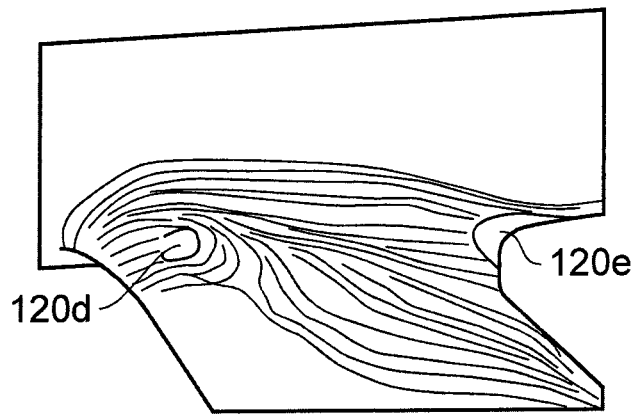
FIGS. 18a-c show design plots of the CATIA model, pressure contours with surface restricted streamlines and a detailed view of the flow lines in the wing-fillet region respectively for the designs furthest away from Pareto front of FIG. 16.
Figure 18B:
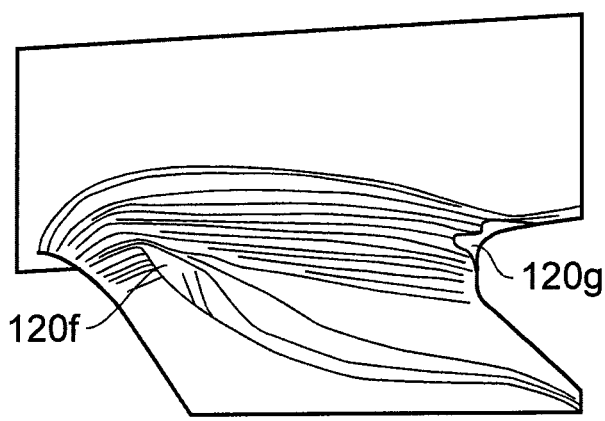
Figure 18C:
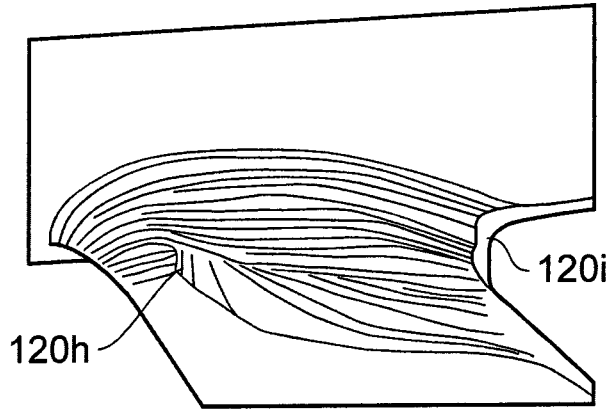
Figure 20A:
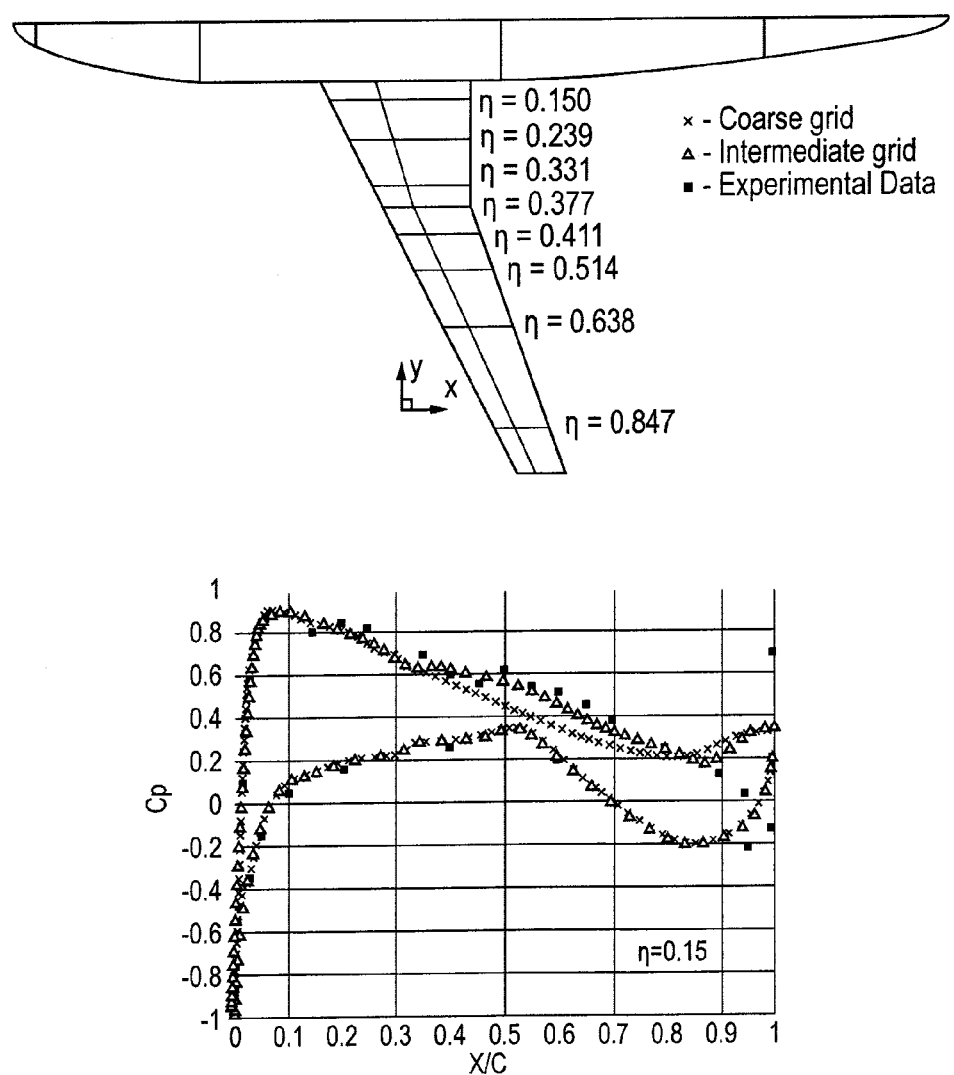
FIGS. 20a-h show comparisons of wing surface pressure distributions achieved using the coarse and intermediate meshes of the DLR-F6 wing-body configuration at M=0.75 (Mach Number=0.75), $C_L$=0.499 (Lift Coefficient=0.499) and the experimental wind tunnel data at eight semi-span locations normalised over the wing cord length.
Figure 20B:
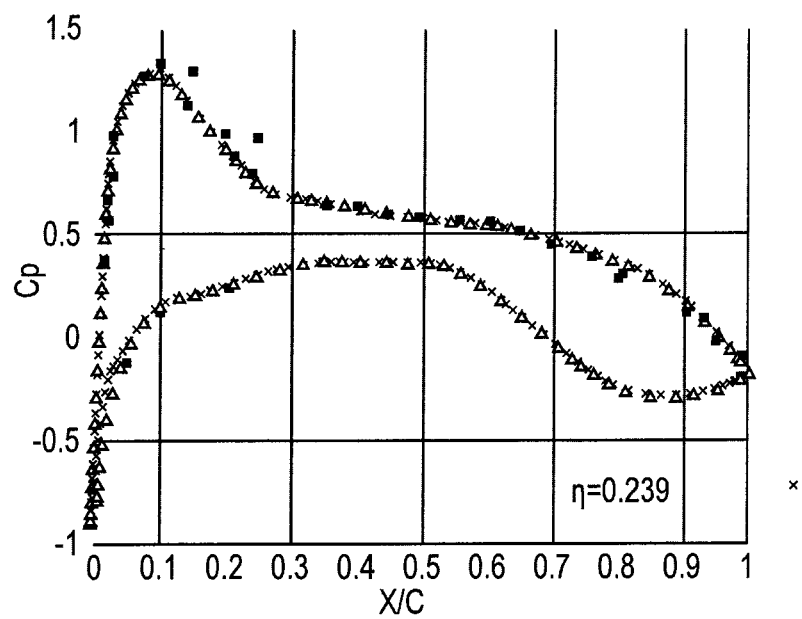
Figure 20C:
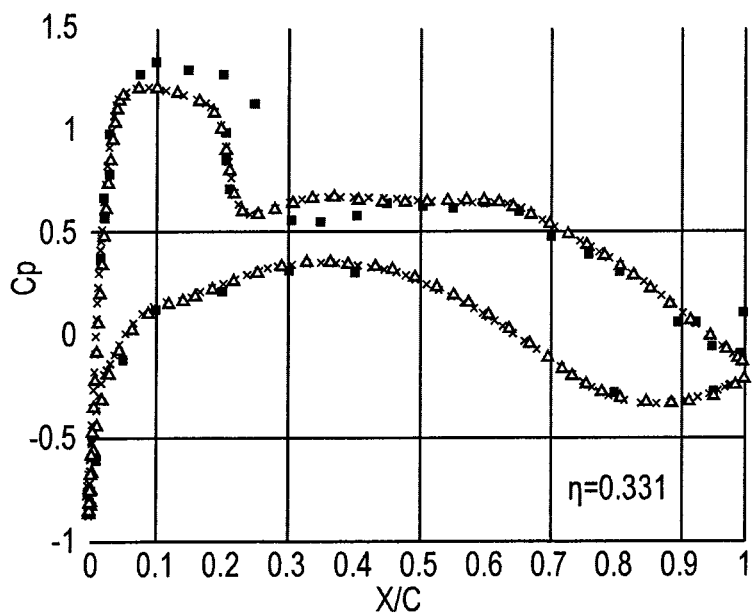
Figure 20D:
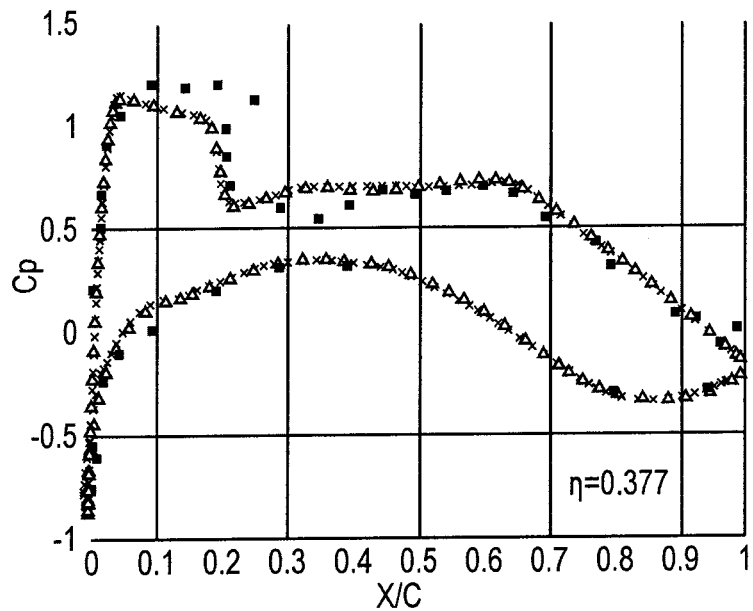
Figure 20E:
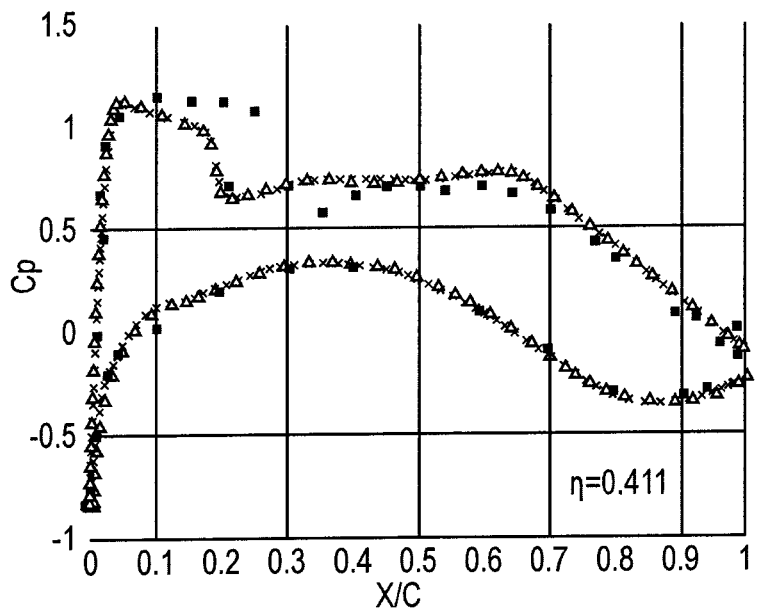
Figure 20F:
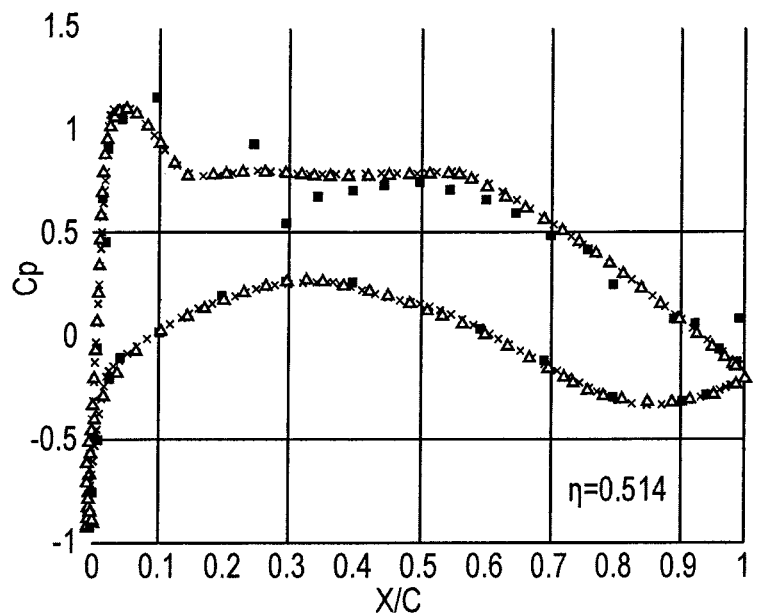
Figure 20G:
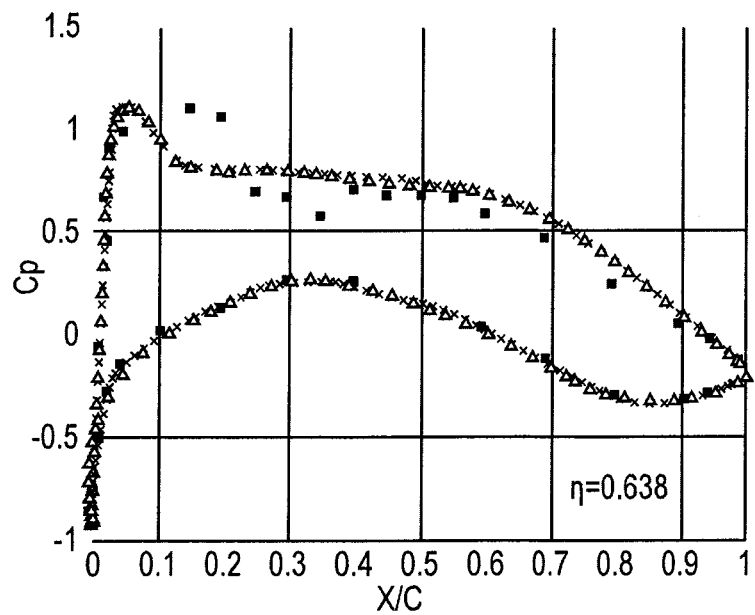
Figure 20H:
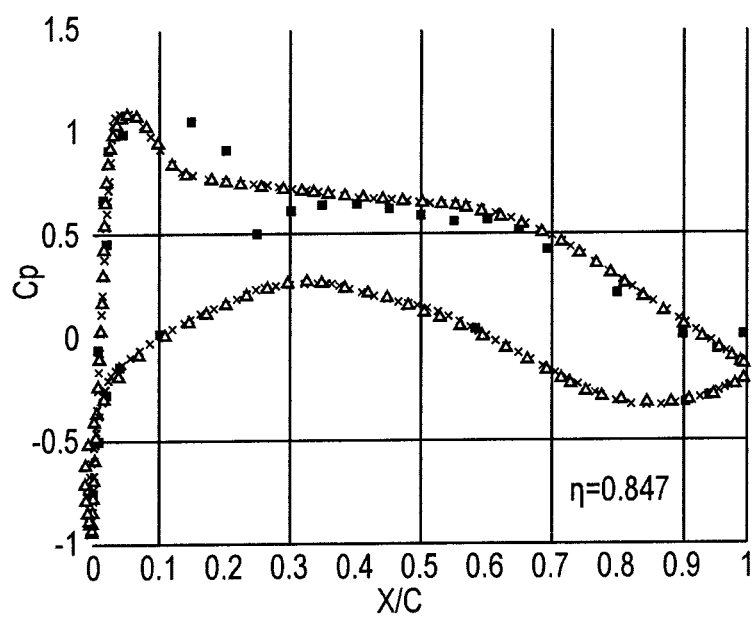

If a boundary layer is required it is applied after the initial volume mesh is created. The boundary layer is grown from the surfaces, pushing the existing volume mesh out. As a result Harpoon restricts the boundary layer height to a maximum of three times the local cell height. Note that it is preferable to keep it within two times the local cell height. If more detail is required within a certain area a refinement region can be used. For this case study refinement regions are placed around the trailing edge and more importantly the wing-fuselage junction (see FIG. 17). It is expected that the drag changes seen between designs is likely to be relatively small. It is, therefore, paramount that the flow within this region is captured with as much detail as possible. The refinement region around the fuselage-wing junction is sized so as to enclose any of the possible wing-fillet designs.

H. CFD Analysis

All CFD simulations within this study involve solving the three-dimensional steady-state Reynolds averaged Navier-Stokes equations. The turbulence model selected for this problem is the Spalart-Allmaras (SA) one equation model. This was chosen as it has been proven to give accurate results for external flow problems. More details of the turbulence model can be found in Spalart, P. and Allmaras, S., "A one equation turbulence model for aerodynamic flows," *La Recherche Aerospatiale*, No. 1, 1994, pp. 5-21 (Spalart and Allmaras). The SA turbulence model was also one of the models examined during the second drag prediction workshop (12 out of the 29 submitted cases used SA).

The boundary conditions used for the full DLR-F6 geometry analyses are set to simulate the design cruise conditions as shown in table 1 using far-field pressure boundary conditions. Details of the setup used are displayed in the table in FIG. 15.

The output from the CFD simulations are fed back into the OPTIONS optimisation routine at step 99 in FIG. 13 to update the RS and/or to determine whether the design has been sufficiently optimised.

I. Initial Results

Figure 16:
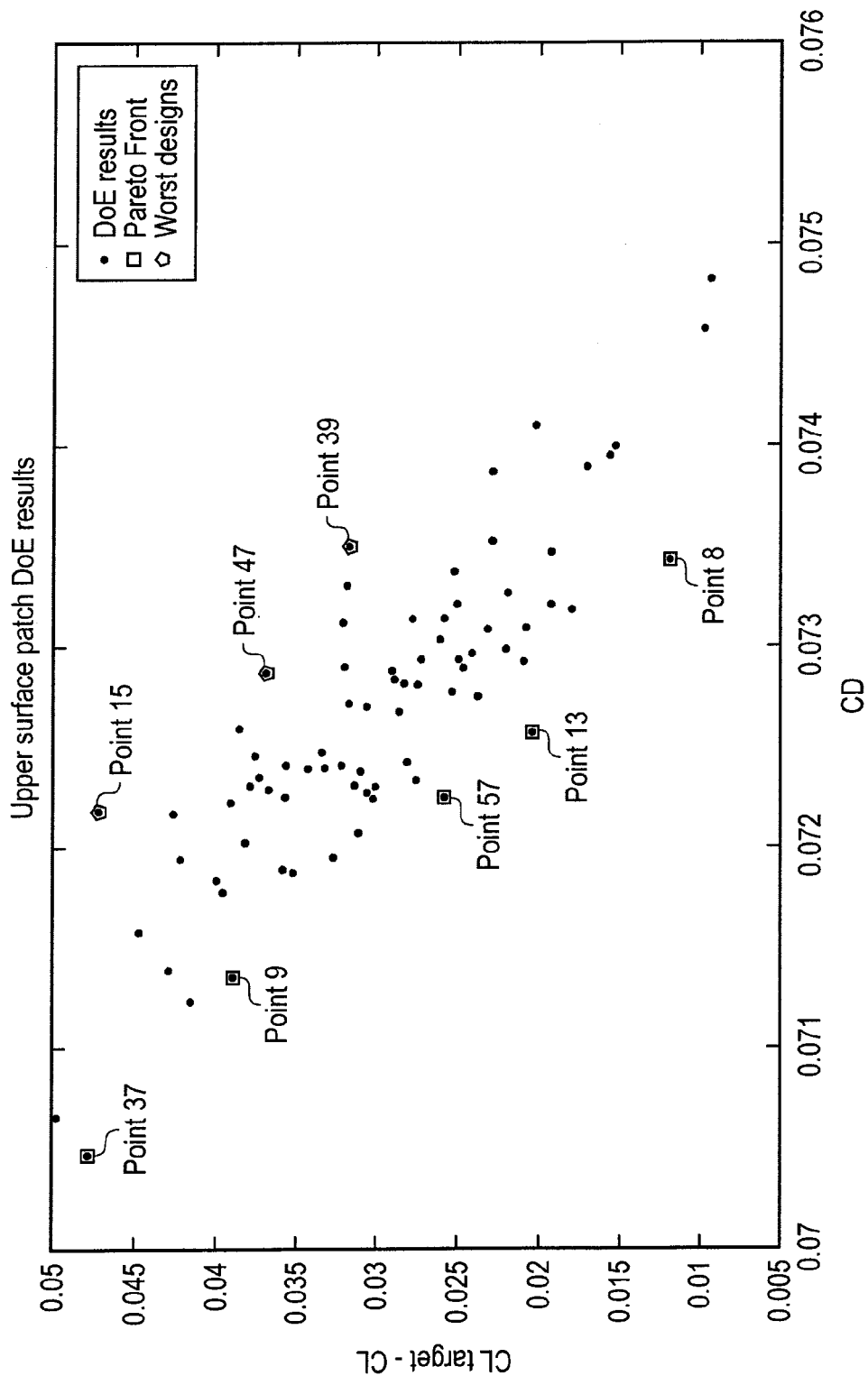
FIG. 16 shows a distribution of the results evaluated during an initial eighty point DOE for the wing-fillet case study.

FIG. 16 shows a distribution of the results evaluated during an initial eighty point DOE. The graph shown plots the deviation of the lift coefficient $C_L$ from a target lift coefficient, versus the drag coefficient $C_D$ calculated during the CFD simulations of each design. The results display a relatively significant variation in $C_D$ of, as well as a maximum distance of 0.05 from the target lift coefficient. This distribution contains a Pareto-like front upon which the best preforming designs reside. There is an obvious trade off between minimising the $C_D$ value and minimising the distance from the target $C_L$ value. Designs such as point nine perform the best with respect to the drag values achieved, however they perform the worst when assessing its lift coefficient compared to the target value. The exact opposite is true of design eight, however both of these designs lie on the Pareto front. Details of a selection of designs located on the Pareto-like front (design points 8, 9, 13, 37, 57) and those farthest away from the front (design points 15, 19 and 47) can be seen in FIGS. 17*a-c* and 18*a-c* respectively. For each design plots are shown of the CATIA model, pressure contours with surface restricted streamlines and a detailed view of the flow lines in the wing-fillet region.

By examining the plots of the flow in the wing-fillet region it is clear that the dominating flow features are the separation bubbles 120*a-i*. These separation bubbles 120*a-i* are located at the trailing edge of both the designs on the Pareto front (shown in FIGS. 17*a-c*) and the designs away from the Pareto front (shown in FIGS. 18*a-c*), and also on the upper surface of the designs away from the Pareto front. The designs located on the front do not exhibit the separation on the upper surface that is seen on the designs away from the front. The lower surface shows no significant flow features on any of the designs explored. It is also clear that the flow spread is significantly larger for the worse performing designs than those situated on the Pareto front. It appears that the development of this separation bubble increases the drag and so moves the designs away from the Pareto front. The CATIA models for each of the designs that exhibit this behaviour display a concave junction line at the wing surface, which is not present on the front designs. It is therefore likely that the high degree of curvature change within this region produces the aforementioned undesirable flow feature. It would be expected that any optimisation process would select designs with gradual changes in curvature.

Every design shows the separation at the trailing edge that is prevalent in the analysis of the base geometry. It is of interest to note that when comparing the wing-fillet region flow for the designs located on the Pareto front the size of the trailing edge separation seems to be directly linked to the drag value achieved. Design 9 shows a significantly smaller separation bubble than that shown by design 8. This is also true to a lesser extent for the designs located away from the front, where design 15 shows a smaller separation bubble to that of design 39. An examination of the CATIA models leads to the conclusion that designs with a larger wing-fillet towards the trailing edge show a reduction in the separation bubble size. This seems to correlate with a reduction in the drag value. This seems to validate the design proposed by Raymer with an increasing radius along the aerofoil chord length. It is thought that although no designs resulted in the elimination of the trailing edge separation bubble if the trailing edge patch was optimised along side the upper surface patch this may be possible.

It would be expected that any subsequent optimisation process using this case-study would be able to further refine the Pareto-like front to produce some better designs.

SUMMARY AND CONCLUSION

A new method of linking free-form deformation with CATIA V5 has been described that can be used to optimise complex junction shapes. It has been shown how this method can be integrated within an optimisation framework, using the example of a wing-fuselage fairing. Details of how the optimisation process is set up is given, along with an analysis of the initial DOE results achieved. This case study showed that after just the initial DOE a significant reduction in $C_D$ was achieved.

For the purpose of the mesh dependency study three sized meshes were produced using the unfaired geometry. The table in FIG. 19 contains details of the mesh sizes and associated boundary layers. The analyses of the meshes is discussed along with the CFD validation study below.

In order to validate the proposed CFD setup, analysis of the full base geometry was completed. The resulting $C_P$ (pressure coefficient) distributions at eight semi-span locations were compared to the wind tunnel experimental data made available by the second drag prediction workshop. FIG. 20 shows the plots of the $C_P$ distributions achieved with coarse and intermediate meshes, normalised over the wing chord length.

It should be noted that during the second drag prediction workshop a correction was made to the data for the affect of the wind tunnel but no CFD solution exactly matched the experimental data. Significant regions of boundary layer separation at the upper wing surface trailing edge were seen during the wind tunnel testing. A large separation bubble was also seen at the rear wing-fuselage junction. The accuracy of any CFD analysis on this geometry is reliant on its ability to predict this type of flow behaviour. This ability is largely dependent on the grid density/quality and turbulence model selected.

Of particular interest from the second drag prediction workshop is the first case study. This consisted of a single point grid dependency study at cruise conditions (see the table in FIG. 21 for cruise condition details). The table in FIG. 22 summarises the lift and drag data found during the effort and analysis of the coarse and intermediate meshes. It is clear that the $C_D$ value achieved by both the coarse and intermediate meshes are close to the average value achieved during the effort. $C_L$ values for both grids are within the effort range. The effort showed that generally CFD under predicted AoA and $C_D$. With respect to AoA this is true for both analysis meshes, whilst the $C_D$ values are slightly over that predicted.

Figure 23:
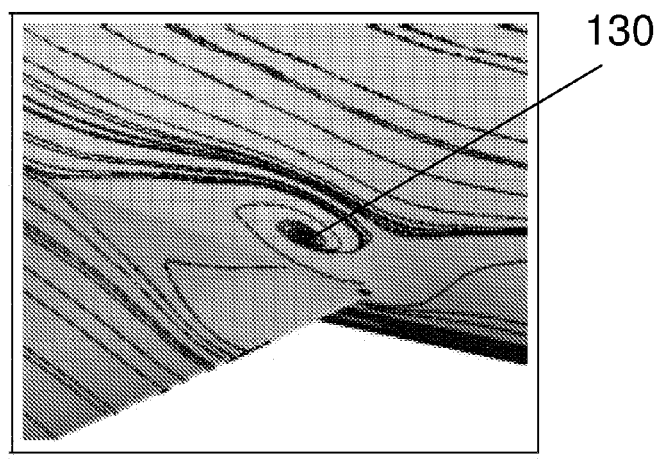
FIG. 23 shows a separation bubble predicted by the coarse grid analysis of the first case study from the second drag prediction workshop.

On comparing the $C_P$ profiles for the wing-lower surface achieved by each mesh it can be seen that generally the CFD solutions are in good agreement with experimental data. This is expected, given that during the wind tunnel testing, no major flow features were seen on the lower surface. The upper wing surface $C_P$ profiles do not show such a good correlation with the experimental data. It is clear that the CFD analysis is not accurately capturing the position of the shock on the upper surface. For both analyses the predicted shock location was to the left of the experimental data on all the semi-span profiles. However, the general shape of the distribution is seen to approximate the data well. The largest deviation from the experimental data is seen on semi-span profile $\eta=0.150$ towards the upper surface trailing edge. This is within the predicted separation bubble region. During the effort similar $C_P$ profiles at $\eta=0.150$ were achieved by Rumsey et al in Rumsey, C., Rivers, S., and Morrison, J., "Study of CFD variation on transport configurations from the second drag-prediction workshop," *Computers and Fluids*, Vol. 34, 2005, pp. 785-816 and by Scheidegger et al in AIAA, *Second drag prediction workshop*, 2007. It is thought that the reason for the deviation is the variation in the size of the separation bubble predicted by the CFD code. FIG. 23 shows the separation bubble 130 predicted by the coarse grid analysis. Rumsey and Scheidegger both saw this deviation reduce with an increase in mesh size. With respect to the mesh resolution tested here, very little difference can be seen between the profiles predicted for each grid size, and this is also seen in the $C_D$ values predicted. A slight improvement in deviation from the experimental data at the separation bubble is seen with the intermediate mesh.

Although the $C_P$ profiles do not exactly match the experimental data, the correlation with the $C_P$ profiles achieved during the effort is encouraging. The $C_D$ values achieved are close enough to the experimental value to suggest that the current CFD setup is producing reasonable results. The analysis of the fine grid would produce a better match to the experimental $C_P$ profiles. During the effort, authors stated that by matching the angle of attack rather than the $C_L$ value a better agreement with the experimental data could be achieved. It is thought that initial findings of the CFD validation and mesh dependency studies are encouraging enough to validate the CFD setup for use in the optimisation process.

Although the invention has been described above with reference to one or more preferred embodiments, it will be appreciated that various changes or modifications may be made without departing from the scope of the invention as defined in the appended claims.

The invention claimed is:
1. A method of design optimization of a geometric object using Directly Manipulated Extended Free Form Deformation (DM-EFFD) comprising:
 a. receiving an initial definition of the geometric object from a computer aided design (CAD) system, in terms of locations of surface construction points in a global coordinate system;

b. simulating fluid flow around the geometric object using a computational fluid dynamics (CFD) mesh of the geometric object to produce a measure of fluid dynamic performance of the geometric object;

c. defining a control volume that encloses the geometric object using a 3D extended free form deformation (EFFD) lattice of control points with non-parallelepiped shaped lattices;

d. defining a local coordinate system within the control volume and obtaining local coordinates of the surface construction points;

e. receiving from a user, locations of one or more direct manipulation (DM) points positioned on the geometric object in terms of the global coordinate system and converting them to local coordinates;

f. receiving from the user required positions of the direct manipulation points where they will be after deformation and converting them to local coordinates;

g. computing the locations of the lattice control points required to produce the required positions of the direct manipulation points where they will be after deformation;

h. computing the locations of the surface construction points of the geometric object where they will be after deformation from the computed locations of the lattice control points and converting them to global coordinates, wherein the computed surface construction points define a deformed geometric object;

i. simulating fluid flow around the deformed geometric object using a CFD mesh of the deformed geometric object to produce a measure of the fluid dynamic performance of the deformed geometric object; and j. identifying an optimal design of the geometric object using the measures of fluid dynamic performance of the initial geometric object and the deformed geometric object produced in steps b and i respectively.

2. The method of claim 1 wherein the identified optimal design of the geometric object is not the design of the initial geometric object.

3. The method of claim 1, further comprising: testing a quality of a response surface; and, if the response surface is of insufficient quality, repeating steps b-j for one or more further geometries.

4. The method of claim 1, wherein:
the measure of the fluid dynamic performance of the deformed geometric object is based on a lift coefficient.

5. The method of claim 1, wherein:
the measure of the fluid dynamic performance of the deformed geometric object is a lift coefficient.

6. The method of claim 1 further comprising: manufacturing aircraft utilizing a wing based on the identified optimal design.

* * * * *